(12) United States Patent
Kellaway, Jr. et al.

(10) Patent No.: US 11,961,038 B2
(45) Date of Patent: *Apr. 16, 2024

(54) SYSTEM AND METHOD FOR COLLABORATIVE AND DYNAMIC COORDINATION OF TRANSPORTATION OF SHIPPING CONTAINERS

(71) Applicant: **E*Dray 20/20, LLC**, Charlotte, NC (US)

(72) Inventors: Kendall P. Kellaway, Jr., Sarasota, FL (US); Reade Kidd, Charlotte, NC (US)

(73) Assignee: **E*Dray 20/20, LLC**, Charlotte, NC (US)

( * ) Notice: Subject to any disclaimer, the term of this patent is extended or adjusted under 35 U.S.C. 154(b) by 52 days.

This patent is subject to a terminal disclaimer.

(21) Appl. No.: 17/839,834

(22) Filed: Jun. 14, 2022

(65) Prior Publication Data
US 2022/0309462 A1 Sep. 29, 2022

Related U.S. Application Data

(63) Continuation of application No. 16/339,169, filed as application No. PCT/US2017/055086 on Oct. 4, 2017, now Pat. No. 11,397,912.

(60) Provisional application No. 62/403,906, filed on Oct. 4, 2016.

(51) Int. Cl.
| | |
|---|---|
| *G06Q 10/0835* | (2023.01) |
| *G06Q 10/08* | (2023.01) |
| *G06Q 10/083* | (2023.01) |
| *G06Q 10/1093* | (2023.01) |
| *G08G 1/00* | (2006.01) |

(52) U.S. Cl.
CPC ....... *G06Q 10/08355* (2013.01); *G06Q 10/08* (2013.01); *G06Q 10/083* (2013.01); *G06Q 10/1097* (2013.01); *G08G 1/202* (2013.01)

(58) Field of Classification Search
CPC ............ G06Q 10/08355; G06Q 10/08; G06Q 10/083; G06Q 10/1097; G08G 1/202
See application file for complete search history.

(56) References Cited

U.S. PATENT DOCUMENTS

| | | | |
|---|---|---|---|
| 7,312,702 B1 * | 12/2007 | Willms | G06Q 50/26 705/333 |
| 9,082,144 B2 | 7/2015 | Jones et al. | |
| 11,397,912 B2 * | 7/2022 | Kellaway, Jr. | G06Q 10/1097 |
| 2004/0167825 A1 * | 8/2004 | Nadan | G06Q 30/0601 705/26.1 |
| 2013/0015950 A1 * | 1/2013 | Wip | G07C 9/00571 340/5.7 |
| 2013/0016636 A1 | 1/2013 | Berger et al. | |

(Continued)

OTHER PUBLICATIONS

Mongelluzzo, Bill, "Free-flow program finds success in Los Angeles port," Journal of Commerce, New York, May 22, 2015.*

(Continued)

*Primary Examiner* — Nathan Erb
(74) *Attorney, Agent, or Firm* — ArentFox Schiff LLP

(57) ABSTRACT

Systems and methods for coordinating the transportation of shipping containers through a terminal are provided. The systems and methods provide for efficient storage of shipping containers in flow stacks in a terminal, enable collaboration among users, and provide efficiencies in executing export street turns and the use of off dock container yards.

13 Claims, 24 Drawing Sheets

(56) References Cited

U.S. PATENT DOCUMENTS

| | | |
|---|---|---|
| 2015/0112476 A1 | 4/2015 | Torson et al. |
| 2015/0193778 A1 | 7/2015 | Meyer et al. |
| 2015/0248639 A1 | 9/2015 | Maney et al. |
| 2015/0287063 A1 | 10/2015 | Meyer et al. |
| 2016/0048799 A1 | 2/2016 | Meyer et al. |
| 2016/0104110 A1 | 4/2016 | Jones et al. |
| 2016/0335593 A1* | 11/2016 | Clarke ............... G06Q 10/0833 |
| 2019/0217874 A1* | 7/2019 | Deng .................... B61D 19/00 |

OTHER PUBLICATIONS

Mongelluzzo, B., "Free-flow program finds success in Los Angeles port," Journal of Commerce, IHS Maritime & Trade, New York, (2 pages Total), May 22, 2015.

\* cited by examiner

538

| RDY Destination Look Up | |
|---|---|
| MAEU 1234567 | Look Up |

| Destination | Importer DC 1234 |
|---|---|
| Address | 51 Tacoma Boulevard<br>Fife, Washington 98105 |
| Container # | MAEU 1234567 |
| Seal # | 7654321 |
| Container Size | 40Day |
| Disposition | FULL |

Empty Return Available

| Tacoma Port | Select |
|---|---|
| Seattle Port | Select |
| Exporter 123 (13 miles away; $65 bonus) | Select |

Send Updated Tender

*FIG. 15*

| | |
|---|---|
| 404 — | Container: Flow Stack - Full    402 |
| 406 — | Location:<br>Terminal 18<br>125 Terminal Street<br>Seattle, WA |
| 408 — | Contact Name: Mike Jones |
| 410 — | Phone: 555-1212 |
| 412 — | Specific Instructions: gates 6-8 |
| 414 — | [ Accept ]    [ Reject ] — 416 |

*FIG. 21A*

| | |
|---|---|
| 422 — | Container: ABCD123456 (40DRY)- Full    420 |
| | Please advise if any damage to container/chassis |
| 424 — | ⊗ No<br>○ Yes |
| | If yes, please explain: |
| | [                    ] — 426 |
| | [ Complete ] — 428 |

*FIG. 21B*

432 — Container: ABCD123456 (40DRY)- Full

442 — Click Here For Driving Directions

434 — Location:
Owner DC 123
123 Main Street
Fife, WA

436 — Contact Name: Peter Brown
438 — Phone: 555-1212
440 — Specific Instructions: Check in gate is off 2$^{nd}$ street. Do not park in front of building.

Deliver
Container: ABCD123456 (40HC)- Empty
Location:
Terminal 46
245 Terminal Street
Seattle, WA
Contact Name: John Smith
Phone: 555-1212
Specific Instructions: gates 1-2

Pick Up
Container: Flow Stack - Full
Location:
Terminal 46
245 Terminal Street
Seattle, WA
Contact Name: John Smith
Phone: 555-1212
Specific Instructions: gates 1-2

456
458

460 — Accept | Reject — 462

FIG. 21D

SYSTEM AND METHOD FOR COLLABORATIVE AND DYNAMIC COORDINATION OF TRANSPORTATION OF SHIPPING CONTAINERS

CROSS REFERENCE TO RELATED APPLICATIONS

This application is a Continuation of U.S. patent application Ser. No. 16/339,169, filed on Apr. 3, 2019, which is a National Stage Entry of International Patent Application No. PCT/US2017/055086, filed on Oct. 4, 2017, which claims priority under 35 U.S.C. § 119(e) of U.S. Provisional Application No. 62/403,906, filed on Oct. 4, 2016, entitled "System and Method for Collaborative and Dynamic Coordination of Transportation of Shipping Containers", the disclosure of each of which is hereby incorporated by reference.

STATEMENT REGARDING FEDERALLY SPONSORED RESEARCH OR DEVELOPMENT

N/A

BACKGROUND

A single ocean-going container vessel can transport thousands of individual shipping containers, also termed intermodal containers or ISO standard containers, into a seaport. Once the vessel is docked at a port, the containers are removed from the vessel, for example, using a straddle carrier or any other suitable crane. The containers are stacked at the port to await the arrival of trucks to pick them up. Containers can similarly be stacked at a rail yard to await further transport to a destination by truck.

Owners of the cargo within the containers, for example, large retailers, as well as non-vessel operating common carriers (NVOCCs), freight forwarders, and steamship lines typically contract with trucking or drayage companies to pick up the containers containing their cargo at a port for transportation to a destination, termed an import move. In many cases, the destination is a transloading facility or distribution center located within a radius of about 100 miles of the port. Some cargo owners, for example, manufacturers, food producers, scrap metal/wastepaper companies, retailers, and brokers, also contract with the trucking companies to deliver cargo from their facility to a terminal for export to a foreign country, termed an export move. The trucking companies dispatch trucks based on orders received from the cargo owners and others to pick up a particular container and deliver it to a particular destination. The trucking companies can contract with a number of owner/operator truck drivers to provide these drayage services for the cargo owners.

For an import move, the trucking company dispatches a truck driver to a location, such as a seaport terminal or rail yard, to pick up a full container and deliver the container to a destination, such as a distribution center of the importing cargo owner. For an export move, the trucking company dispatches a truck driver to pick up an empty container for export, deliver it to the exporting cargo owner's facility and return the laden container to the appropriate terminal. In some cases, the trucking company can also dispatch a driver to pick up an empty container from a cargo owner's facility and return it to the appropriate terminal, or from a terminal to deliver it to an exporting company's facility to be loaded.

Each truck driver must obtain a chassis onto which a container can be loaded. A chassis can be obtained from a neutral pool of chassis, which are standardized to mate with the shipping containers. In other cases, truck drivers can have their own chassis or can have them provided by another third party. For an import move, each driver proceeds to the port and takes a place among lines of trucks, each waiting to pick up a container. See FIG. 1. Each driver has a document identifying the particular container to be picked up by that truck. Once a truck reaches the head of a line, dock workers must locate the identified container, which could be anywhere in the stacks of containers. Other containers may need to be moved before the identified container can be retrieved for placement on the chassis of the truck. Thus, it can take a substantial amount of time to locate a container and load it on the truck. Once a container has been located and made accessible, it is "live lifted" onto the chassis, and the driver can deliver the container to its destination. During this process, other drivers are waiting in lines for their turns to retrieve their identified containers. Wait times can be an hour or longer.

Every terminal has its own system for moving containers on and off vessels and trains and loading containers onto trucks. Every trucking company has its own system for dispatching trucks to pick up and deliver containers. These systems are typically not coordinated with each other.

Occasionally, a large batch of containers containing cargo owned by a single owner can be identified. If properly coordinated, the containers can be loaded together as a batch on the vessel at the port of origin, and placed in one location at the destination port, called a flow stack or peel off pile or free flow pile, to be loaded onto waiting trucks more efficiently. However, this procedure requires significant advance planning and coordination by the cargo owner, involving the trucking company, the vessel owner, and the terminal operator to ensure enough dock workers to unload the containers from the vessel as soon as it docks, enough truck drivers at the appropriate time for pick up, and enough employees at the distribution center to remove the containers from the trucks and unload the containers. Any delays or changes in the process can be disruptive and costly.

Some container ships can transport up to 9,000 containers, and newer larger ships are expected to come online in the future. Cranes are increasing in size to reach over and across the vessels and waters are being dredged to accommodate increased draft required for these vessels. However, not much is able to be done on the terminal land, as most facilities are geographically landlocked by cities, waterways and highways. Accordingly, delays in loading the containers onto the trucks are likely to increase. A single truck may make multiple trips to the port during a shift to transport containers to a destination. Thus, delays in this process can also be costly to the cargo owners and the trucking companies, as well as to the truck drivers, who get paid for each load transported.

SUMMARY

Systems and methods for the coordination of the transportation of shipping containers are provided. The systems and methods pool supply and demand, and can provide a continuous and/or daily (rather than batch or occasional) flow of containers from one or more flow stacks at a terminal. Containers with cargo from one or multiple cargo owners can be aggregated as a block stow on an incoming vessel and stored in a flow stack or stacks at the terminal. Real time load dispatching can be provided, by which each load is dispatched in a non-driver/non-cargo owner specific manner. The first driver to arrive takes the first load. Load tenders to drayage companies can be managed rapidly and efficiently, and coordination between drayage companies and other parties can be facilitated. Export street turns can be effected more frequently, resulting in efficiencies and cost savings. Containers can in some cases be stored in off dock yards for more efficient management.

The systems and methods can improve the flow and productivity of the transport of shipping containers from vessel to port to distribution center by enabling collaboration among various stakeholders (ocean carriers, terminals, trucking companies or drayage providers, chassis management companies, cargo owners, NVOCCs, freight forwarders and the like). The systems and methods can integrate and aggregate multiple cargo owners and multiple trucking companies to interface with the terminals via flow stacks in a daily, repeatable manner and achieve economies of scale. The systems and methods can centralize execution of functions at the terminals and off dock yards, and driver dispatch functions and create efficiencies by employing route optimization technologies. The systems and methods can also provide supply chain visibility for planning, forecasting, and operational metrics across all stakeholders. The collaborative approach involving many stakeholders can create a network density that increases efficiencies in the transportation of shipping containers. The systems and method can also improve environmental sustainability by reducing emissions from idling trucks, empty miles driven, and overall miles driven.

DESCRIPTION OF THE DRAWINGS

The invention will be more fully understood from the following detailed description taken in conjunction with the accompanying drawings in which:

FIG. 15 is a schematic illustration of an embodiment of a user interface showing destination details for an entered container identification number;

FIGS. 21A-21G schematically illustrate an embodiment of a mobile application for a driver.

DETAILED DESCRIPTION

Systems and methods are provided for the coordination of the transportation of shipping containers. The systems and methods provide for the rapid discharge of shipping containers from a terminal, such as a seaport or railway terminal, using flow stacks for dynamic or real-time dispatching of truck drivers to pick up and deliver shipping containers. As used herein, "shipping container" can include any type of container transportable by truck, such as, for example, intermodal containers and ISO standard containers as well as containers for out of gauge shipments and overweight loads.

Figure 1:
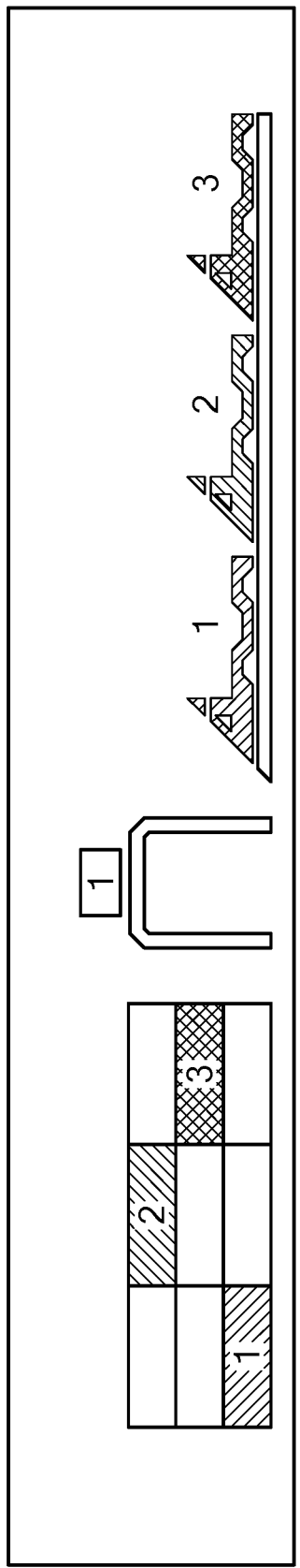
FIG. 1 is a schematic illustration of a prior art discharge queue.
Figure 2:
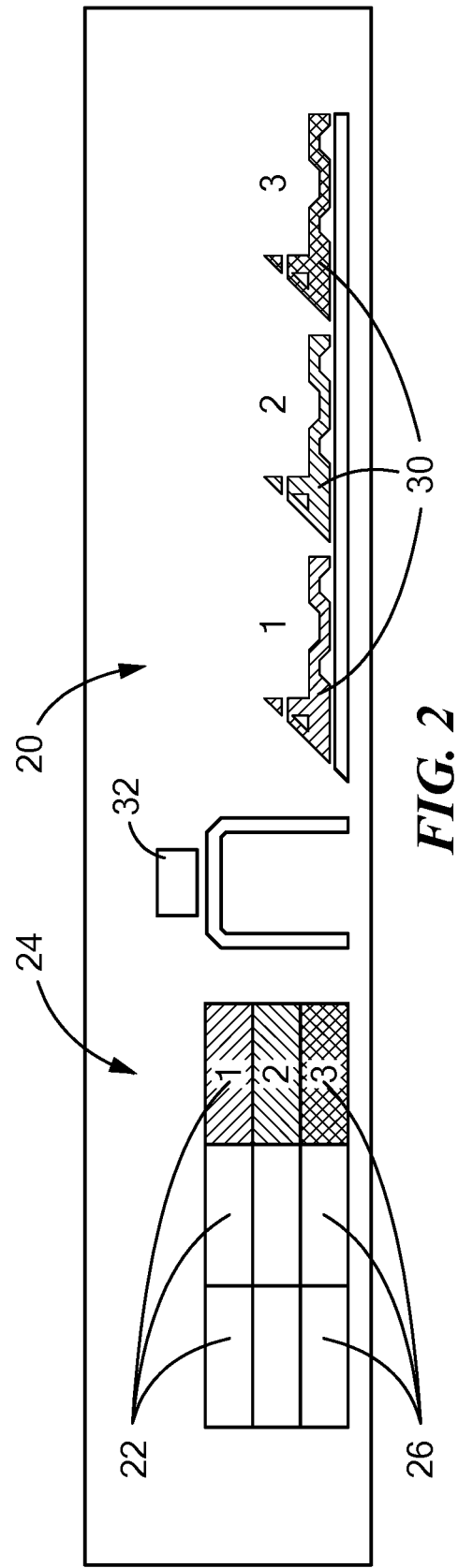
FIG. 2 is a schematic illustration of a discharge queue according to an embodiment of a shipping container transportation coordination system of the present invention.

Some embodiments of a system and method for the coordination of the transportation of shipping containers are described with reference to FIGS. 2-16. Referring to FIG. 2, shipping containers 22 arriving at a terminal, such as a seaport 20, can be unloaded from a vessel into one or more flow stacks 26, which can be located in any area in the terminal. In some embodiments, containers can be stored in an off dock container yard. The system can track the containers, which each have a unique identifier, and can match each container with its intended destination after leaving the terminal. In some embodiments, the containers can be placed in a determined order in the flow stacks, indicated schematically in FIG. 2. For example, in a first stack, container 1 is on the top of the stack, container 2 is in the middle of the stack, and container 3 is on the bottom of the stack. From information obtained through coordination at the port of origin or while the vessel is on the water, the system can provide information and instructions to the terminal operator to have dock workers unload containers to the flow stacks and stack the containers in the flow stacks according to the determined placement. In some embodiments, containers can be stowed on the vessels at the point of origin in a dedicated block, called block stow. With block stow, arriving containers can be moved more efficiently to the flow stacks when all loaded together and be made available for pick up more quickly.

Figure 3:
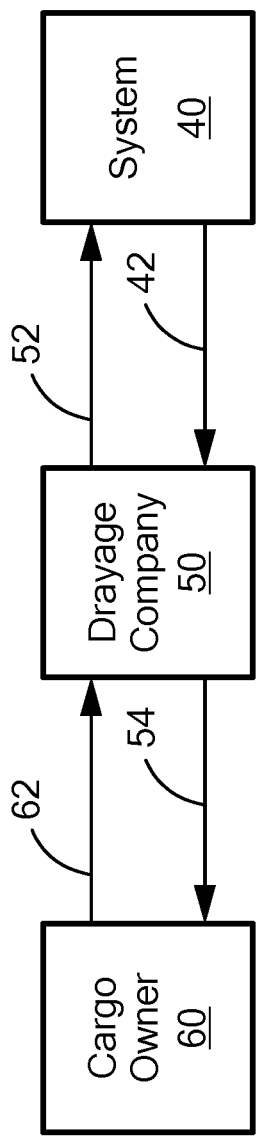
FIG. 3 is a block diagram of an embodiment of a shipping container transportation coordination system.
Figure 4:
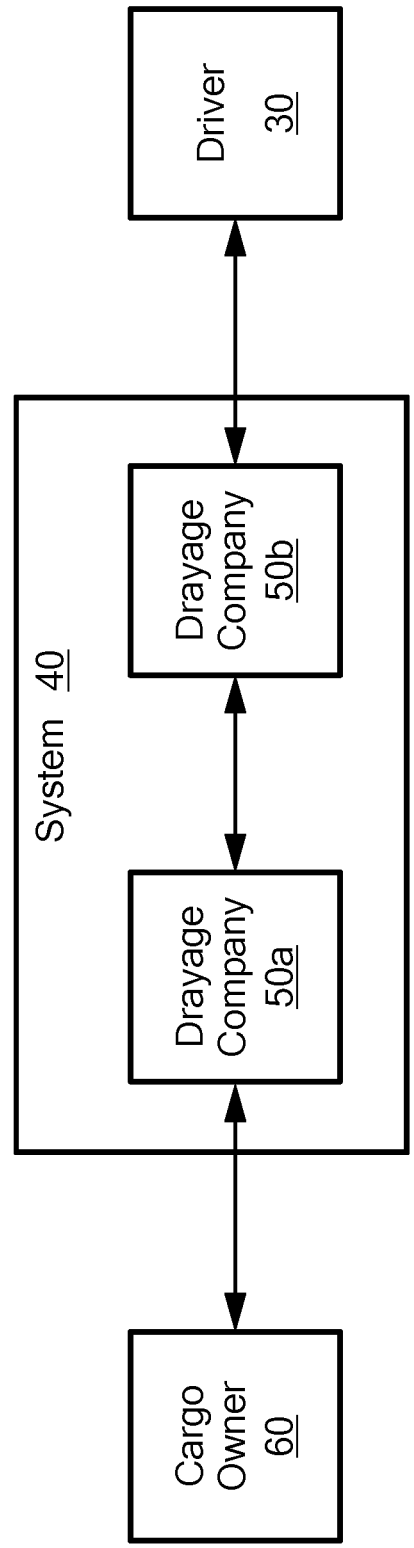
FIG. 4 is a block diagram of a further embodiment of a shipping container transportation coordination system.

In some embodiments, the system 40 can interface with drayage companies 50 to enable coordination among the drayage companies and cargo owners 60. See FIG. 3. The drayage companies and cargo owners can collaborate to create dedicated multi-customer flow stacks for continuous and/or daily execution of container shipments. Referring to FIG. 3, a cargo owner 60 can tender 62 a load of containers to a drayage company 50 before the load arrives at the intended terminal. Several days before the load arrives, the drayage company 50 tenders 52 containers to the system 40, which can begin tracking the containers. When containers become available for transportation, the system 40 can trigger tenders 42 to the drayage company, and the drayage company can update the system and send milestone updates 54 to the cargo owner as containers are transported. In some embodiments, the cargo owner can tender a load of containers directly to the system, to prevent a double recording of a load tender at the drayage company. In FIG. 3, only a single cargo owner and drayage company are indicated for simplicity; it will be appreciated that multiple drayage companies can access and interface with the system, and each drayage company can be in collaboration with one or more cargo owners. Similarly, a single cargo owner can contract with multiple drayage companies to move cargo to its facilities. Additionally, the system can enable two or more drayage companies 50a, 50b to share in the pick-up and delivery of cargo, in a subhauler type arrangement. See FIG. 4.

In some embodiments, the system can provide two types of loads for drayage companies, a contributing load and a fulfilling load. A contributing load is a load from a cargo owner tendered to a drayage company that the drayage company then contributes or tenders to the system. Operationally, the drayage company can treat this load as if the system is a subhauler for them. The system can execute the load by coordinating shipments among the available participating drayage companies. The load can be used to communicate milestones to the drayage company, who communicates the milestones to the cargo owner (the drayage company's customer). The load can also be tracked in the system to bill the customer, and to track free time in case the container needs to be returned before there is a round trip available. Each container gates out and in from the terminal under the SCAC (Standard Carrier Alpha Code) of the drayage company that contributes the container to the system.

A fulfilling load is a load that the system allocates to a drayage company to execute against. Operationally, the drayage company sees this as the system requesting the drayage company to subhaul for the system, as if the system were the cargo owner. In actuality, the system does not "own" the cargo; the subhaul model is used for ease of communication. This load is sent to the driver for execution.

In some embodiments, multiple-customer import flow stacks can be used at the terminal. More particularly, a number of containers from multiple customers can be aggregated in a volume at the terminal to allow drayage companies to take the first container available. With this arrangement, overall turn time through the terminal can be reduced.

The system can facilitate collaboration among various parties in several ways. For example, in some embodiments, when larger importers have enough cargo to each create their own flow stacks, drayage companies can use the system to collaborate through block stow on the vessel and can participate in the same flow stack in the terminal for this expedited delivery.

In some embodiments, the system can provide a capability for some importers to partner with other importers for collaboration on flow stacks. These partners can be predetermined groups who all book to the same block stowage on the vessel (which can also include their own stacks), but can have their own stack at a destination port specifically for the select importers and drayage companies. This ability can achieve a network density suitable for flow stacks but with selected participation. The system can manage and facilitate these stacks just as with the other scenarios.

Figure 5:
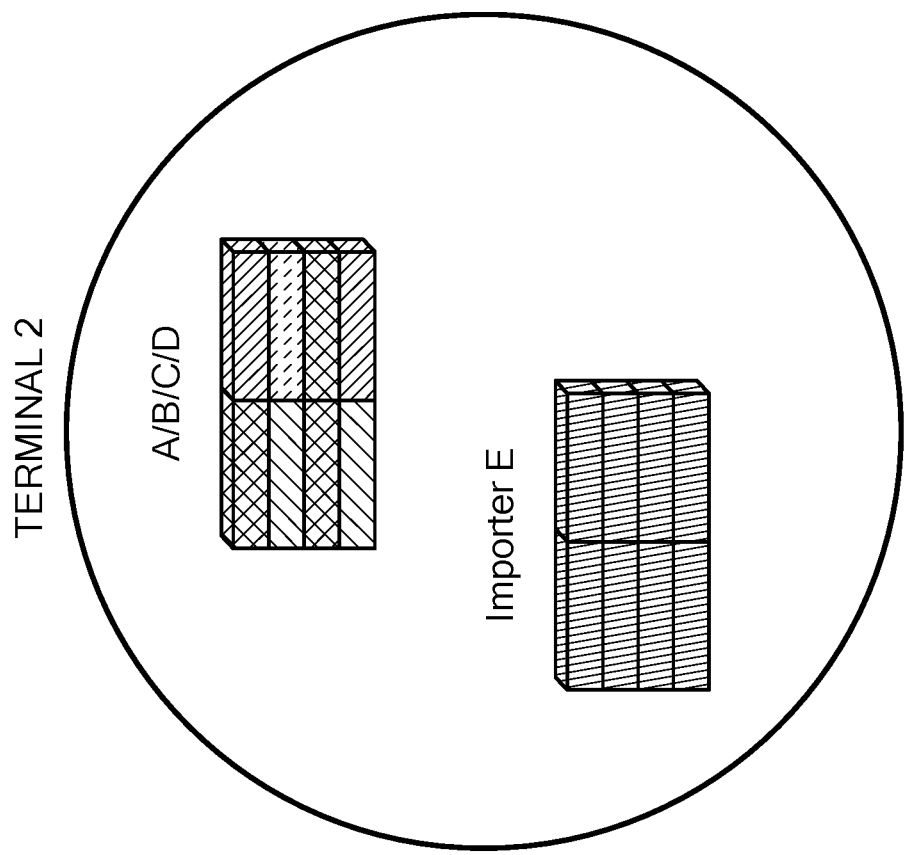
FIG. 5 schematic illustration of flow stacks for multiple importers at two terminals.
Figure 5:
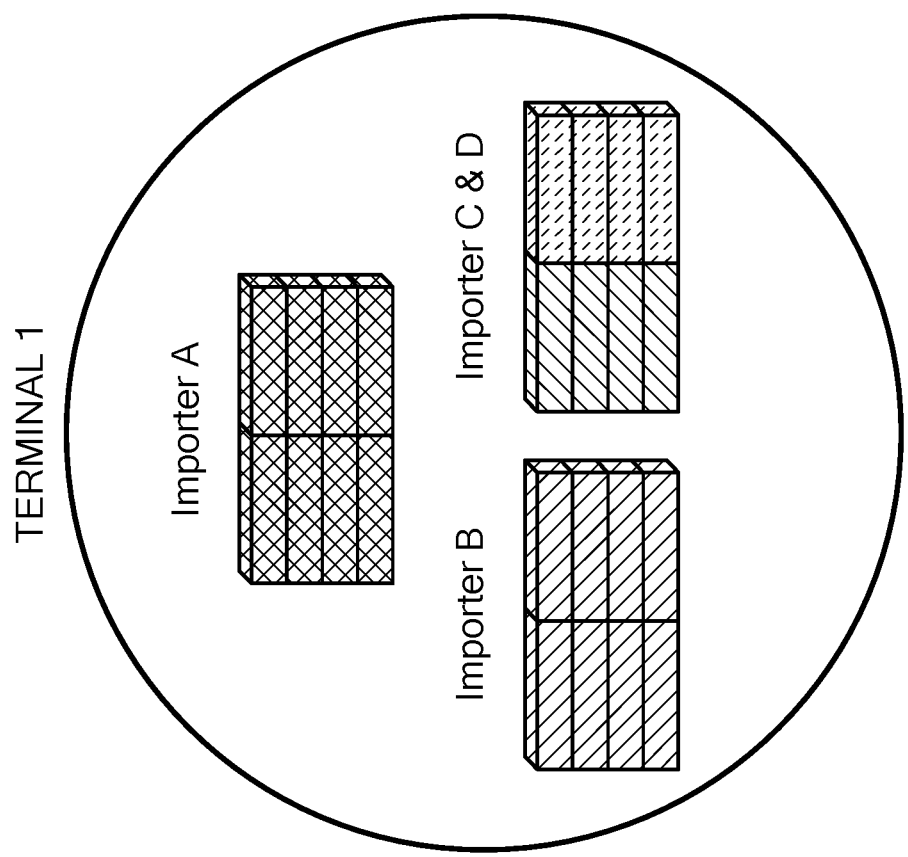
Figure 6:
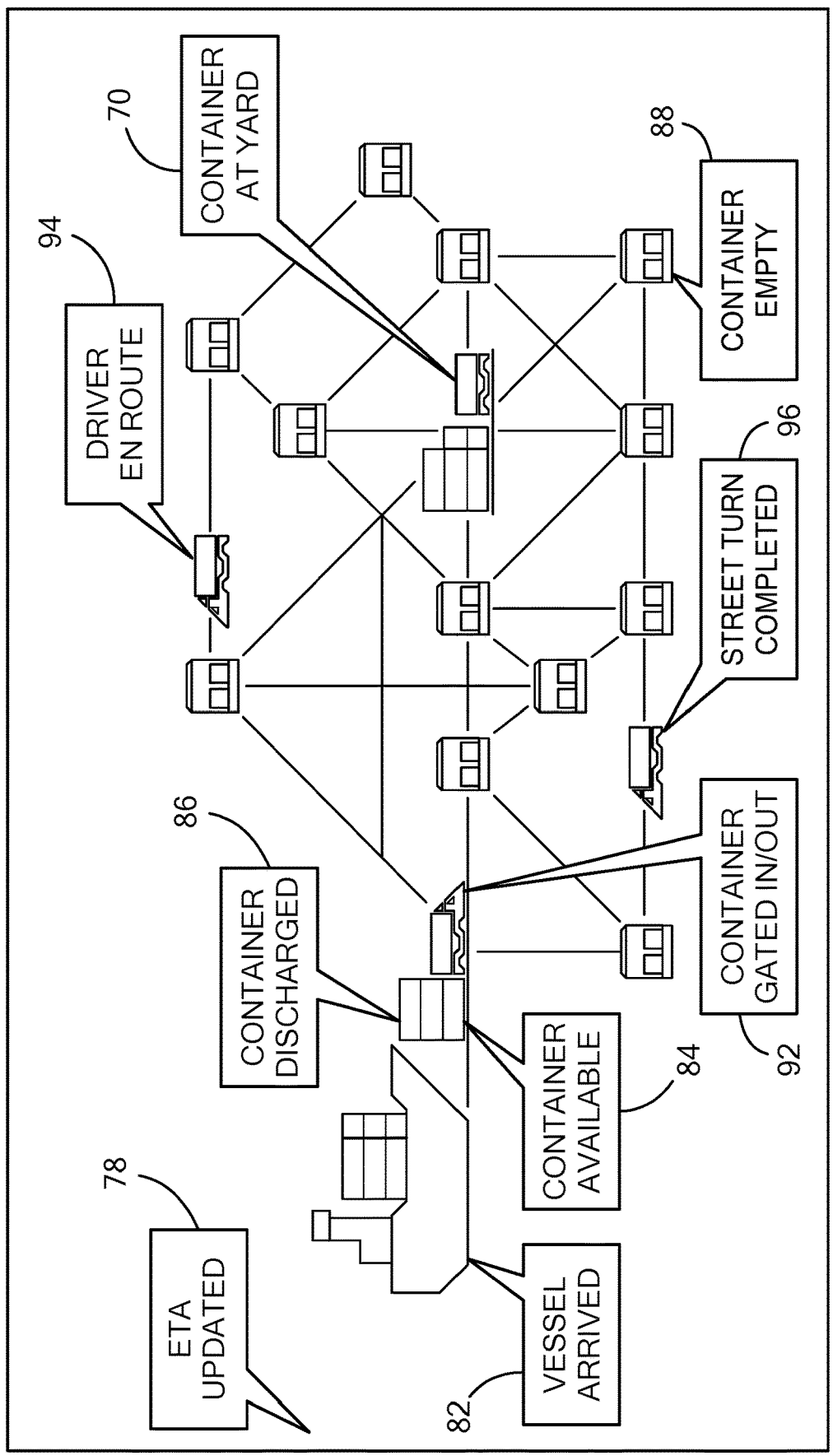
FIG. 6 is a schematic illustration of an embodiment of a shipping container transportation coordination system.
Figure 7:
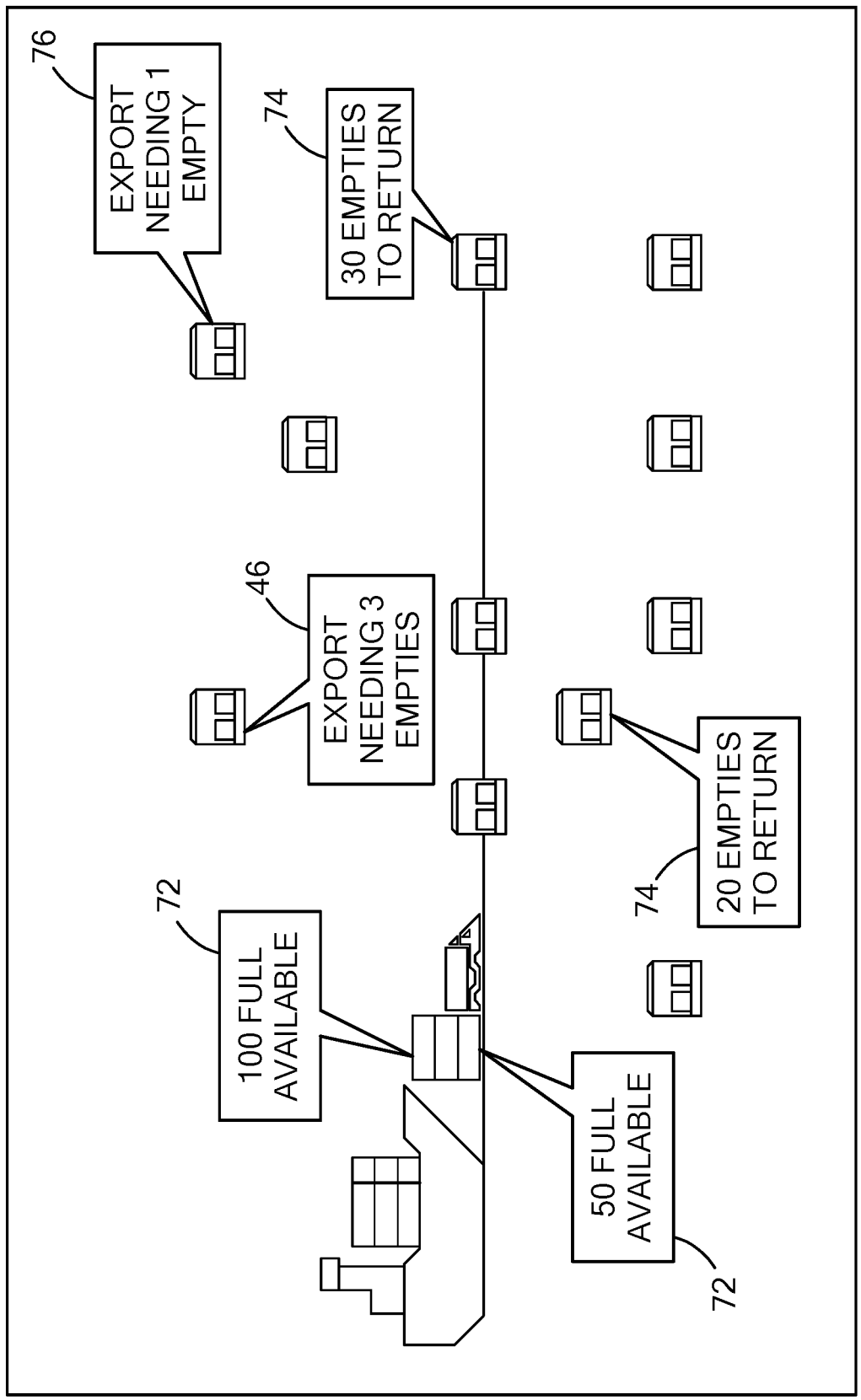
FIG. 7 is a schematic illustration of an example of dynamic dispatching according to an embodiment of a shipping container transportation coordination system.
Figure 8:
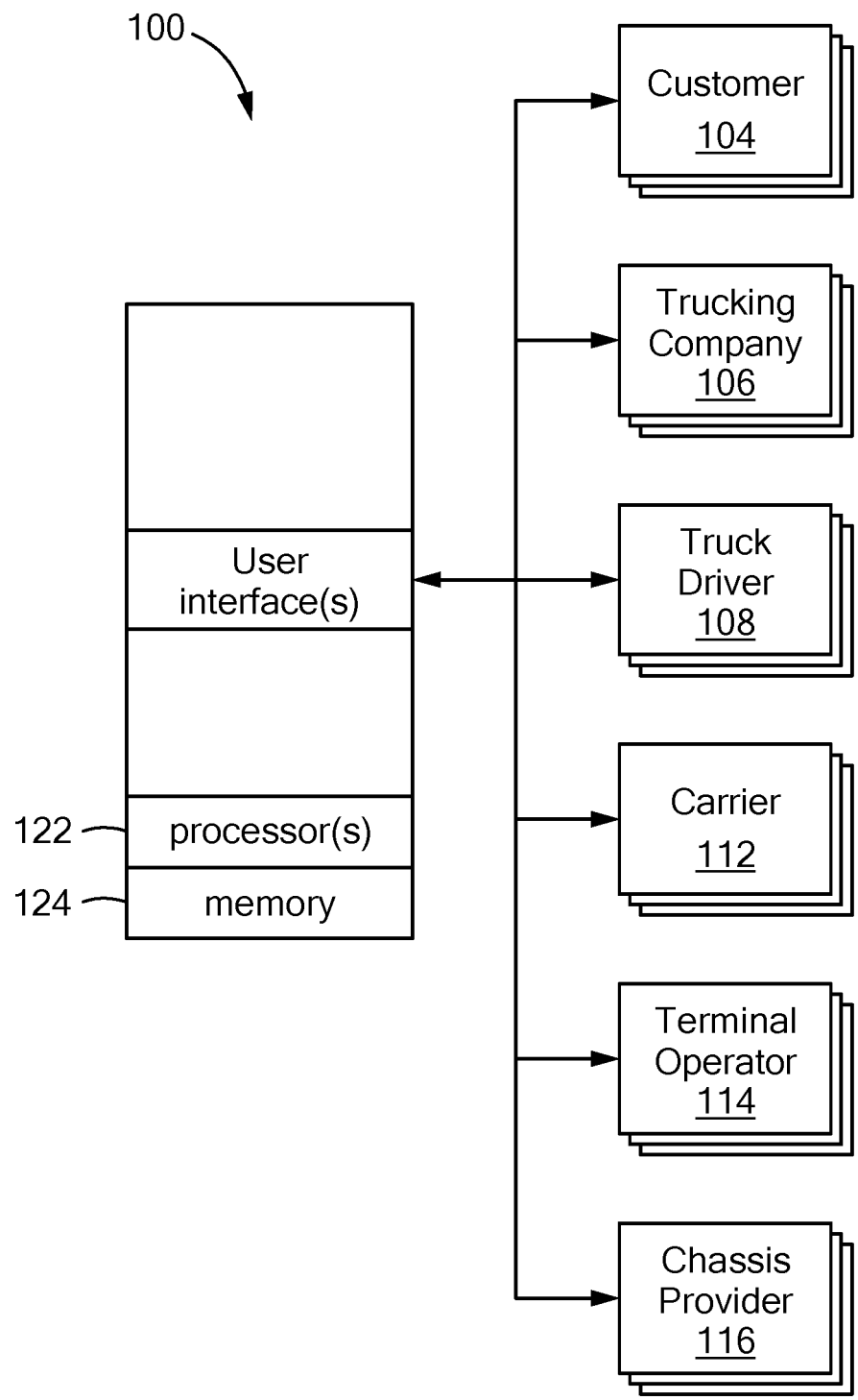
FIG. 8 is a schematic block diagram of an embodiment of a shipping container transportation coordination system.

FIG. 5 illustrates an example in which several importers have their own stacks and shared stacks. At Terminal 1, Importers A and B each have their own stacks, and Importers C and D share a stack. At Terminal 2, Importer E has its own stack, and Importers A, B, C, and D share a stack.

In some embodiments, the containers can be segregated in the stacks in predetermined locations within the terminal. Thus, the system enables containers destined for similar locations in a high volume commercial zone to be placed together. For example, distribution centers operated by cargo owners can be located at various distances from a terminal. The area around a terminal can be divided into zones based on distance from the terminal. For example, distribution centers located within about a 20-mile radius of a terminal may be placed in a first zone, distribution centers located within about a 20 to 40-mile radius of the terminal may be placed in a second zone, etc. The containers can be stacked at the terminal on their destination zones.

In some embodiments, a portion of the drayage community can be willing to collaborate with another drayage company that participates in the system. This group does not need to select the specific companies involved. Instead, each drayage company or group can sign up for a stack that meets the geography and qualifications it needs for the business it is contributing. Again, this stack can participate in the collective block stow on the vessel, but can be segmented out as a separate stack at destination for a general pool.

In some embodiments, the system can include one or more offsite or off dock container yards 70. See FIG. 6. The off dock yard can provide temporary storage when a delivery is scheduled for a later time or a delivery location is temporarily unavailable. The off dock yard can be used to stage or pre-position containers for import or export moves. The off dock yard can provide peak relief for a port, such as by shuttling containers from a port to the off dock yard during the port's usual or peak hours of operation for delivery after hours. The off dock yard can provide a location for drivers to drop off a chassis at the end of a shift.

In some embodiments, the system can facilitate the dispatching of truck drivers 30 to the flow stacks. The first truck to arrive at a flow stack gets the first container, container 1, off the stack, and the system provides the drayage company and/or the truck driver with the destination of that container. Similarly, the second truck to arrive at the flow stack gets the second container, container 2, off the stack and the system provides the drayage company and/or the truck driver with the destination of that container. This process can be repeated for each arriving truck.

In some embodiments, the system can employ a dynamic or real time dispatching procedure for load tenders. A load tender to a drayage company can be determined based on a route optimization procedure that takes into account various factors. Factors can include the number and location of full and empty containers. See FIG. 7. Full containers 72 can be available for pick up at a terminal for delivery to an importer. Empty containers 74 can be located at an importer after unloading or at an offsite container yard. An exporter 76 may need to receive one or more empty container to fill with cargo for export.

In some embodiments, factors for route optimization can also include the locations of vessels, containers, and truck drivers at various milestones, which can be tracked by the system. See FIG. 6. For example, the system can track the estimated arrival time 78 and actual arrival time 82 of a vessel at a seaport. The system can track when a container at a terminal is available for transport 84, when a container has been discharged 86 to a truck driver, and the location of containers at offsite container yards 70 or empty containers at distribution centers 88. The system can track the location of the truck driver at milestones such as gating in and out of a terminal 92, en route to a distribution center 94, or executing a street turn 96 (described further below). In some embodiments, the system can track hours of service worked per shift for each truck driver. Based on this data, optimized routes can be transmitted to the drayage companies and/or drivers to provide efficient transportation of the containers. In some embodiments, the participants collaborating on a particular stack may choose not to optimize the routing and instead only pick up from terminals for which they contributed loads.

In some embodiments, the system can provide for export street turns, in which a container is unloaded at a distribution center with imported goods, and an empty container (the same container or another container previously unloaded) is taken to an exporter. At the exporter, the container is loaded with goods for export and returned to the terminal for export. Thus, the container is not returned to the terminal between import and export uses.

In some embodiments, the system can provide enhanced reporting and forecasting services for users of the system, described further below. In some embodiments, the system can provide financial reconciliation across the contracted drayage companies, can provide financial audits, and process payments from and to users of the system, described further below.

The system can result in increased productivity for the terminals, increased productivity for the drayage companies, truckers, and improved service and reduced cost for the cargo owners. The cargo owners receive increased services with fewer missed pickups. Wait time payments for flow stack shipments are reduced or eliminated. More drivers can be accessed, resulting in more coverage. Drivers can handle an increase in the number of loads per day. This can result in increased profitability per load. The system can result in a reduction in truck idling, in miles driven by a truck carrying no container or empty containers, and in overall mileage driven by trucks.

In some embodiments, a system and method 100 can be implemented as a computer-networked service in communication with various different types of users or stakeholders. See FIG. 8. The users can include drayage or trucking companies, cargo owners, non-vessel operating common carriers (NVOCCs), freight forwarders, steamship lines, ocean carriers, terminal operators, truck drivers, and chassis providers. In some embodiments, the system can reside on a central server or servers and can include one or more processors 122 and memory resources 124. The users can access the system via any suitable communication network, such as the internet, a wired or wireless network, and the like.

In some embodiments, a computer-implemented system can provide each type of user with an application residing or operating on a user's computing device that provides an interface suitable for the needs and requirements of that user. Applications can include or use any suitable application programming interfaces (APIs) to enable communication of data between the system and the various user devices. In some embodiments, the API can conform to the constraints of representational state transfer (RESTful) architecture. Other API call formats or protocols can be used, such as, without limitation, HTML or XML tags, JavaScript, PHP, Python, Perl, or AJAX. Secure communication access methods can be employed to restrict access to only authorized users. Communications methods can employ electronic data interchange (EDI) methods and standards, such as American National Standards Institute (ANSI) ASC X12. Data entry can be done electronically, for example, via suitable user interfaces, and/or can be done manually.

The system 100 can include various modules or components to carry out computer-executable instructions or code, stored in memory 124, to implement the various processes and functionalities described herein. The various modules or components can be implemented independently of each other, or can overlap or share various tasks, routines, subroutines, engines, processing resources, memory resources, and the like.

In some embodiments, the system 100 can include a set up module, by which users can set up an account and profile and which can allow users to update the system with appropriate data at various times. In some embodiments, the system can communicate with one or more of the following types of users: cargo owners, drayage or trucking companies, truck drivers, ocean carriers, terminal operators, and chassis providers.

Cargo owners (sometimes also termed customers herein) can be importers, who are bringing cargo into the country, and exporters, who are shipping cargo out of the country. Customers can also include entities such as NVOCCs, freight forwards, and steamship lines. A customer interface 104 for communication with the system can be provided. A customer profile can include information such as the customer's name, ID, address, contact information, the locations of distribution centers, and the maximum capacity and available capacity of the distribution centers. Distribution centers can include, for example, transloading facilities and warehouses. Additional information and details regarding each distribution center can be provided, such as the address of or directions to an appropriate gate, parking instructions, and the like. The customer can update the system with information regarding incoming shipping containers. For an import, such updates can include the container numbers, the name of the vessel on which the containers are traveling, the port of entry, and the estimated time of arrival at that port. For an export, such information can include the number of empty containers needed, and once the containers are filled, the container numbers, and the vessel name, port of departure, and time of departure. The customer can also provide updates regarding the available capacity of the distribution center. For example, during a particular time period, the distribution center may be too full to accept all of the expected incoming containers. In that case, the system can determine an optimum procedure for handling the incoming containers, such as leaving them at the terminal for a period or temporarily moving them to an offsite container yard until the distribution center can accept them.

Trucking or drayage companies contract with individual truck drivers to handle import and export moves for cargo owners and other customers, and can provide other services to truck drivers as well, such as assistance with truck leases, insurance, and maintenance packages. A trucking company interface 106 for communication with the system can be provided. A trucking company profile on the present system can include the company's name, ID, address, contact information, permits for cross-state movements, preference on driving destinations, and an identification of the individual truck drivers who drive for the company. Some trucking companies can also have the capacity to store containers in offsite container yards. The trucking company can provide information regarding the available capacity to store containers temporarily and update as appropriate. Trucking companies typically employ transportation management systems, which are software-based systems for coordinating dispatches with drivers and cargo owners. The present system can interface with the transportation management system used by each trucking company. For example, as a driver accepts a tender, starts a pick up, completes intermediate milestones and completes the move (pick up, delivery, or a shuttle move between locations), these updates are also communicated to the trucking company's transportation management system.

The truck drivers are typically owner/operators who contract with the trucking companies. Many truck drivers keep an electronic log book of their hours of service, which are governed by law for safety reasons, and employ a software-based system for tracking the loads they deliver. In some embodiments, the drayage companies can communicate notifications and tenders from the system to the truck drivers. In some embodiments, the system can provide a communication tool 108, such as a mobile application, that can be downloaded by each truck driver to a suitable remote computing device, such as a smartphone, tablet computer, or the like. In some embodiments, the mobile application can also interface with the electronic log book software system used by the trucking company. The mobile application allows each driver to communicate with the system from any location. The truck driver profile on the present system can include the driver's name, ID, contact information, and information regarding the driver's truck. The mobile application is in communication with the system to provide a driver with notice of a dispatch, termed a load tender, and to provide the driver the option to accept or reject a tender. The mobile application can provide the driver with the capability to input other information, such as, without limitation, results of import load container inspections and seal numbers on container seals. The mobile application can also provide signature capture capabilities, for example, to provide receipts for delivery of a container or an interchange of a container from one user to another.

Ocean carriers or steam ship lines own the seagoing vessels that transport containers filled with cargo from one country to another. The ocean carriers also own the containers and typically allow a container to be out of their direct possession for a limited period of time before a per diem charge is assessed to the cargo owner. An ocean carrier interface 112 for each customer for communication with the system can be provided. An ocean carrier profile can include information such as the carrier's name, ID, contact information, vessel identification, port of discharge, customer name, container identification information, and container billing information. The ocean carrier can update the system with information regarding vessel arrival times, actual container discharge date and time, container available date, and any holds or damages to the container.

Terminal operators manage seaports where cargo is unloaded from incoming vessels and loaded onto outgoing vessels. The terminal operators hire and manage dock workers to perform the loading and unloading tasks, and store containers in container yards at the port and offsite. A terminal operator owner interface 114 for communication with the system can be provided. A terminal operator profile can include information such as the terminal operator's name, ID, contact information, and maximum capacity and available capacity of one or more container yards. Container yard status can include updates to its available capacity, as containers are moved in and out. The terminal operator can update the system with information regarding the availability of containers in the rapid dispatch yard and the number and identification of empty containers. The terminal operator can also notify the system of the status of vessels, availability status of containers, and events that might cause delays, such as storms, customs inspections, labor disruptions, or overall congestion.

The chassis providers manage the chassis that are used to transport the containers by truck. The chassis are standardized to handle the containers. A chassis provider interface 116 for communication with the system can be provided. A chassis provider profile can include information such as the chassis provider's name, ID, contact information, the availability of chassis, location of chassis and any plan or capability to position additional chassis into the market as needed. The chassis provider can update the system with information regarding the availability of chassis, the quality of the chassis equipment, and any updates regarding planned maintenance.

In some embodiments, the system can include various software and hardware-based resources to implement a number of desired functionalities. In some embodiments, the system can be implemented as any suitable computer system including one or more processors and memory. In some embodiments, functionalities can be implemented using programming modules, engines, routines, sub-routines, and the like that provide suitable computer-executable instructions. In some embodiments, functionalities can be implemented using application specific integrated circuits, field-programmable gate arrays, and the like. In some embodiments, application programming interfaces can be used to assist communication with users over a network and to interface with existing software products employed by users.

In some embodiments, the system can interface with existing commercial software programs used in the drayage industry. For example, in some embodiments, the system can interface with other transportation management systems (TMS) to provide data to the TMS that is then displayed or otherwise presented to the trucking companies and/or drivers via the TMS. Data can include information relating to truck operations, such as, without limitation, driver milestones (for example, driver has accepted a dispatch, driver is en route to pick up, and the like), and per diem/empty repositioning. In some embodiments, the system can provide each truck driver with a mobile application or other communication tool to transmit a notice of a dispatch, termed a load tender, to a driver, who can accept or reject the tender and for other notifications and communications.

In some embodiments, the system can interface with the operational management system used by the terminal to provide onsite management, gate control, and stack assignments. Many cargo owners and other customers use a software package for domestic operations outside of port operations. In some embodiments, the system can interface with such systems or components of such systems to provide reservations, track/trace functionality, billing, and additional charges, known as assessorials, for example, for items such as wait times.

Figure 9:
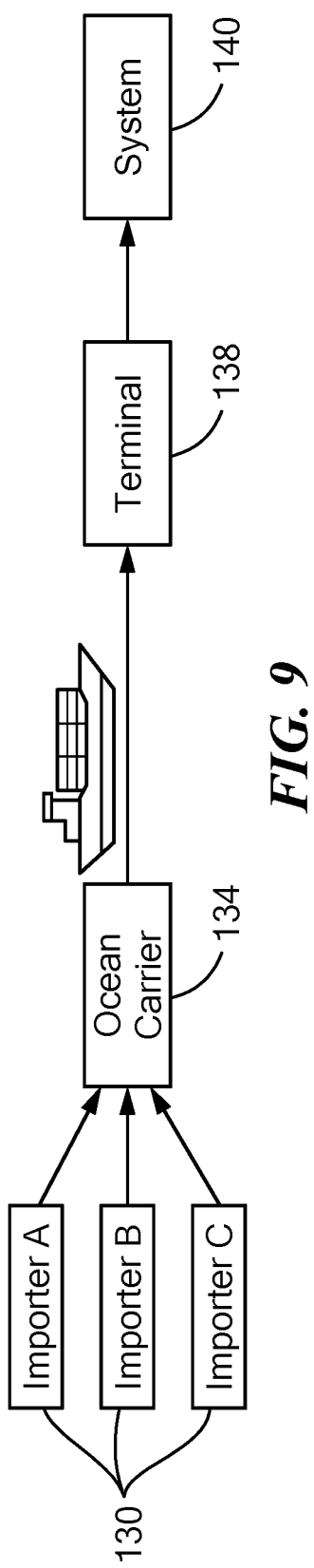
FIG. 9 is a schematic flow chart of an embodiment of operations of a shipping container transportation coordination system.
Figure 10:
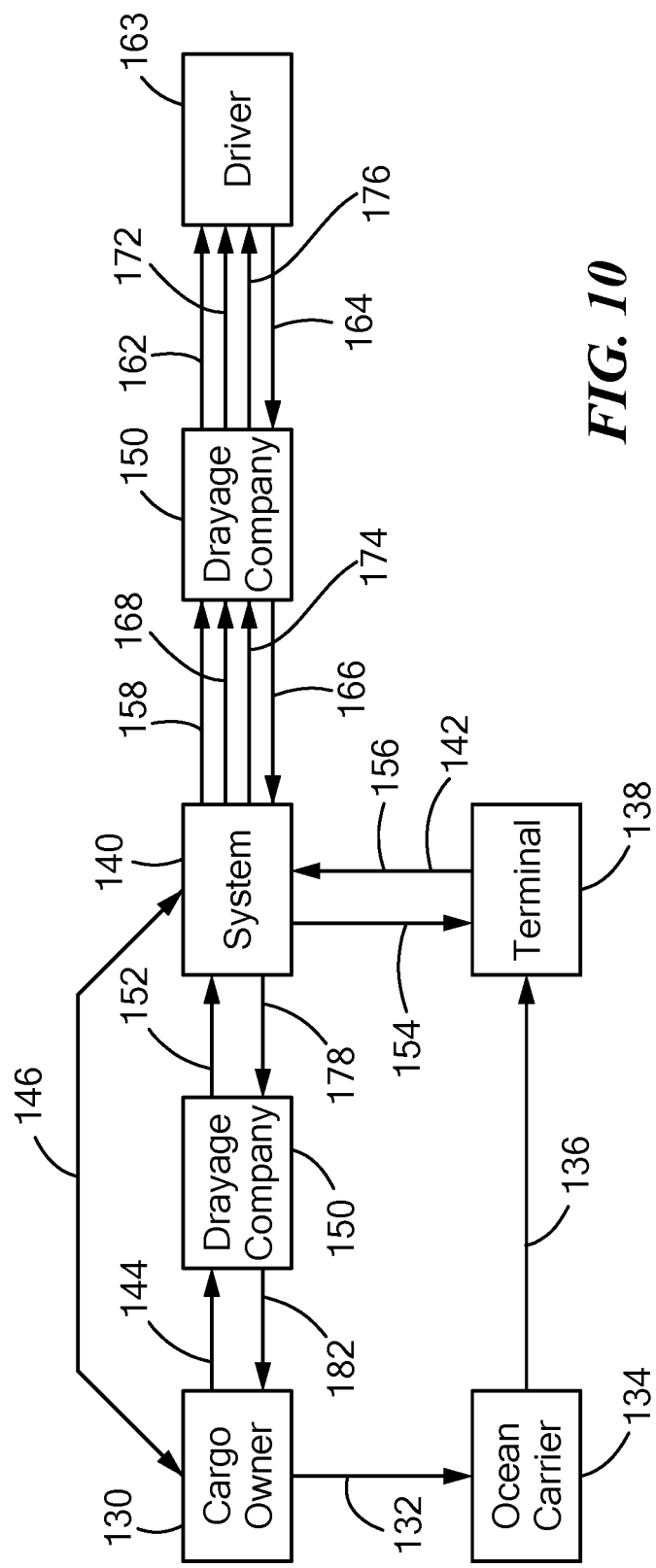
FIG. 10 is a schematic flow chart of an embodiment of further operations of a shipping container transportation coordination system.
Figure 11:
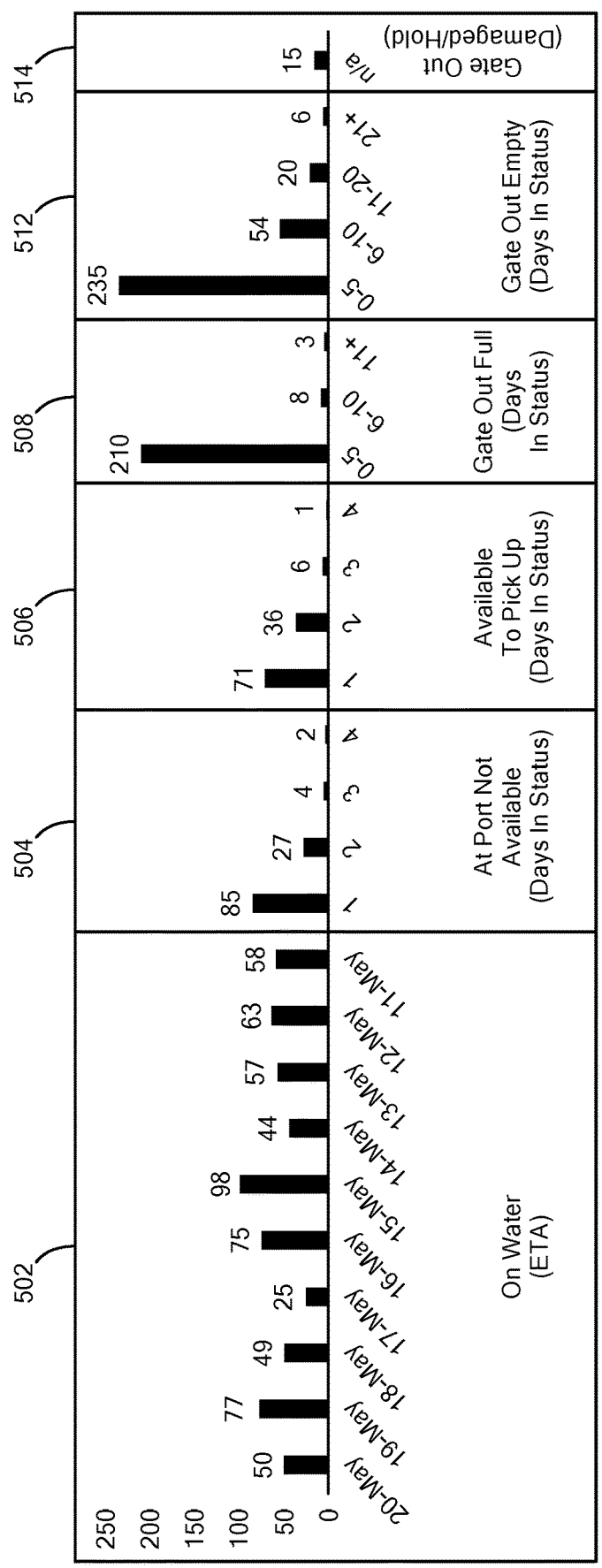
FIG. 11 is an illustration of tracking of shipping containers.
Figure 12:
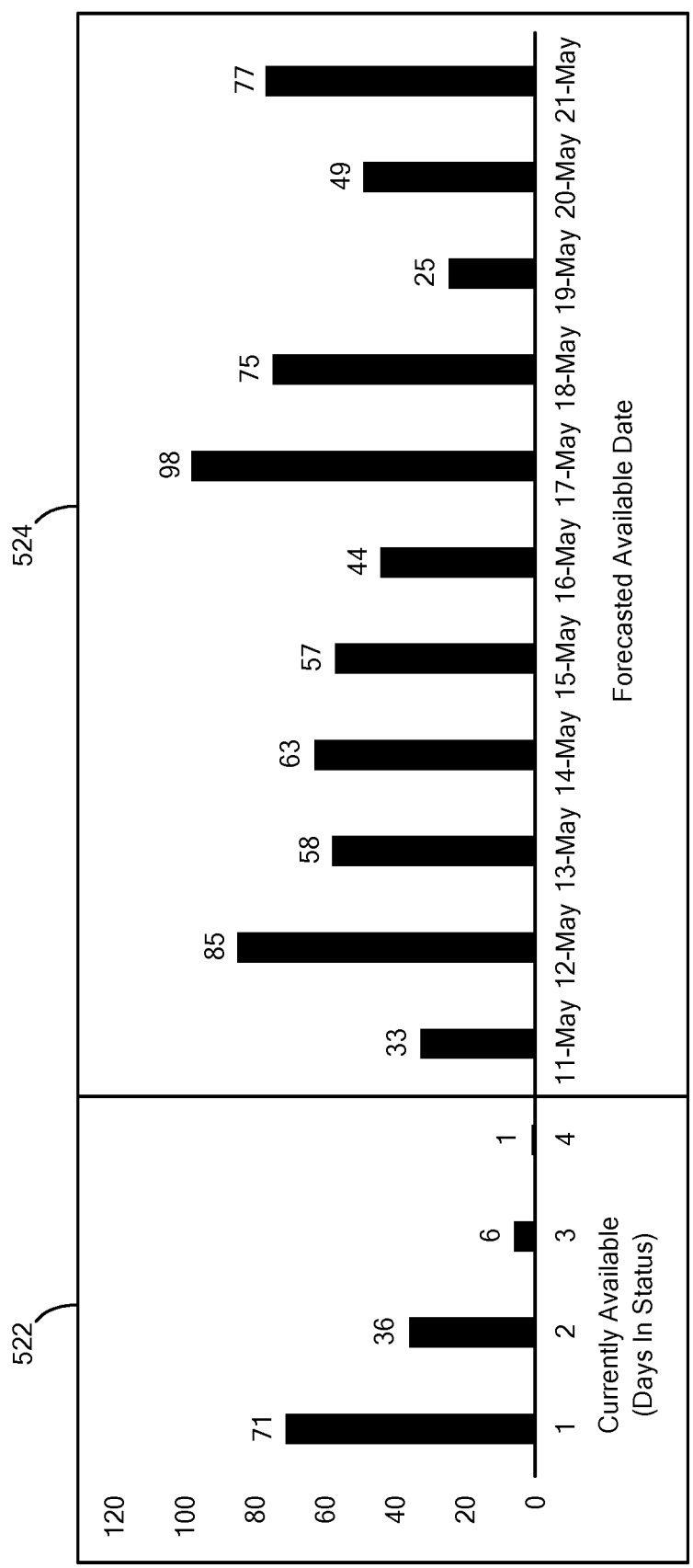
FIG. 12 is an illustration of an availability forecast of shipping containers.

Operation of some embodiments of the system can be further described by reference to the schematic flow diagrams of FIGS. 9-10. A cargo owner 130 or importer can book 132 a load with an ocean carrier 134 as a block stow with the system. The ocean carrier transmits 136 the vessel plan to the terminal 138, including the block stow indication. The terminal operator then advises 142 the system 140 of the containers that have been block stowed on the vessel. The cargo owner 130 (or another party on behalf of the cargo owner) also tenders 144 the containers to a drayage company 150 or directly 146 to the system 140.

At some time before the vessel's estimated time of arrival (ETA) at the terminal, the drayage company 150 tenders 152 the containers to be included in the system's execution of the shipment. In some embodiments, the drayage company tenders the containers to the system at least 5 days before the vessel's ETA. At the time of tender, the system 140 begins to track the containers and monitors their status, so that the system can indicate when the containers are available for pick up at the terminal. The system 140 marks the containers as "unavailable" until they become available for execution (moving to their destinations). The system can also provide forecasting of the monitored containers along the way (described further below). The status of the containers can be available to the drayage companies as needed.

At a selected time before ETA, the system 140 can reconcile the drayage contribution to the system with the block stow information from the terminal. In some embodiments, the reconciliation occurs at 5 days before ETA. The system can advise 154 the terminal of any containers to be omitted if unclaimed based on the reconciliation. The terminal can confirm back 156 that those containers will be omitted.

Once containers become available at the terminal, a dispatcher for the drayage company 150 can select a quantity of available containers to tender out to its drivers and request a dispatch from the system. In some embodiments, the drayage company can also select from which terminal to pick up when more than one terminal is located in the drayage company's area. The drayage company's request can trigger a one-way tender 158 from the system to the transportation management system (TMS) used by the drayage company. Since the particular container to be picked up from the flow stack is unknown at this stage, the tender includes only the terminal name and a unique load reference number. The drayage company can also request assistance from a subhauler if desired. (See FIG. 4.) The drayage company then tenders 162 a load to a driver 163.

The drayage company 150 can receive a notification 164 from each driver with an identification of which full container was picked up and can transmit this notification 166 to the system. This notification can trigger in the system an update 168 with the corresponding details regarding the container, such as the container's destination, which is transmitted to the drayage company. The drayage company can then pass updated information 172 on to the driver for execution, validation of the seal number, and any other actions.

When claiming the full container, the dispatcher at the drayage company can also be provided an opportunity to request an empty container to return, creating a round trip move. If an export street turn is available, the system can offer it 174 to the drayage company at this time, who can pass it along 176 to the driver.

The drayage company can tender the one-way moves to their drivers, who will execute the moves. The drivers can send milestone updates 164 to the drayage company as moves are completed. The drayage company can send the milestone updates 166 to the system 140 as the moves are completed. The system can send milestone updates 178 from a fulfilling drayage company to the contributing drayage company. The drayage company can send milestone updates 182 to the cargo owner 130.

Under the subhauler arrangement, each container gates out and in under the SCAC (Standard Carrier Alpha Code) of the drayage company that contributes the container to the system. The system can reconcile contributions and execution between drayage companies and can invoice the drayage companies, who can invoice their customers.

When containers are stored in the flow stacks, the first available container from the flow stack could go to a number of destinations. Containers that are all going to a similar zone or distance off the terminal can be stored in one area. Some containers, however, may not be destined for a zone for which there is a designated flow stack in the terminal. Also, some importers and exporters, even within a zone, may require scheduling an appointment to deliver a container. Accordingly, in some embodiments, the system can employ an off dock model for such containers, by which these containers can be pulled to a local yard, where the containers can be tracked by the system. Thereafter, drivers can pick up and deliver to the final customer based on a schedule or destination outside a zone. When such a load is contributed to the system, the load is flagged in the system. One move can be created from the terminal to the off dock yard, and a second move can be created from the off dock yard to the final destination. The second move can be put on hold until the first move is executed.

In some embodiments, the system can provide reporting and forecasting for cargo owners, trucking companies, chassis providers, and terminals. The system can provide visibility of the tracking of movement of containers. Data such as volume of containers moved during various time periods can be collected and aggregated and made available to the users. Ongoing or currently evolving trends can be identified in real time and reported. Using the historical data and ongoing trends, forecasting of needs can be provided to users. For example, terminals can better predict the need for dock workers and trucking companies can better predict the need for drivers. Historical data can be gathered by the system over time and stored in the memory resources 124, which can include any suitable data base(s) optimized for the particular type of data to be stored (for example, object-oriented, time series).

In some embodiments, the system can provide forecasting so that the drayage companies can be aware of upcoming container shipments. In some embodiments, as a drayage company contributes a container, the system can track the container until its status becomes "available" and can show the drayage company their container quantities (or volumes) across the pipeline over time. See FIG. 11. In some embodiments, six status categories are displayed. These volumes can be displayed based on the contributed containers for a drayage company. In some embodiments, the volume can be displayed for an entire network, covering multiple contributed containers by multiple drayage companies. The status categories can include a first category 502 ("On Water") of containers on the water, with their associated ETAs. A next category 504 ("At Port Not Available") can display those containers that are at the port but not available and their days in that status. Such containers have been unloaded and discharged from a vessel but are not yet available in a stack or are on hold for some reason. A third category 506 ("Available To Pick Up") can include containers that are available to be picked up and their days in that status. These containers are in a stack and ready to go. A fourth category 508 ("Gate Out Full") can include full containers that are gated out (picked up by a driver and taken out of the terminal) but not yet emptied by the distribution center and their days in that status. A fifth category 512 ("Gate Out Empty") can include empty containers that have not yet been drayed back to the terminal and their days in that status. A sixth category 514 ("Gate Out") can include containers that are not ready to be returned for some reason, such as being damaged, and their days in that status.

In some embodiments, the system can provide an availability forecast. See FIG. 12. The availability forecast can include the numbers of containers that are currently available 522 and their days in that status and the number of containers forecasted to be available on upcoming dates 524.

In use, the system can transmit a request to a terminal to prepare flow stacks for the aggregate volume expected to arrive within a certain time such as five days prior to a vessel's arrival. The terminal can communicate back confirmation that the stacks will be created. In the event that the terminal is not able to segment some of the freight as requested, the terminal can notify the system, and the system can advise the contributing drayage company that the volume cannot be handled using the system and will need to be handled directly by the drayage company.

In some embodiments, prior to requesting allocation in the system, a drayage company can request that another drayage company assist them with any available volume, termed a "subhaul." The dispatcher can choose the quantity of moves and can identify another drayage company from which it would like to request assistance. The requested drayage company can see the request, including the number of containers and the pick up location, and can choose to accept all, some, or none of the amount. If the requested drayage company accepts any of the amount, the requesting drayage company's available quantity can be decreased by the amount accepted. Once the subhaul is accepted, the system decreases the requesting drayage company's available quantity by the number accepted. In such a subhauling scenario, the requesting drayage company continues to "own" that move with the cargo owner, and as noted above, the container is pulled under the requesting drayage company's SCAC. Within the system, the actual container/container number is not used for controlling its shipment, since containers are delivered as the first one out of the flow stack.

Figure 13:
FIG. 13 is a schematic illustration of an embodiment of a user interface by which a drayage company can request a quantity of full loads.
Figure 14:
FIG. 14 is a schematic illustration of an embodiment of a user interface with a one way tender of a full load.

When a drayage company has containers available to be picked up, the drayage company can request a quantity, for example, via an interface portal of the system. The FIG. 13 illustrates an example of a system interface screen 534 in which a drayage company can request a quantity of full loads. Once the drayage company has selected a quantity to pick up, the company can pick up that load, typically within an agreed upon time, such as two days. The system can then tender out the terminal pick up location to the drayage company. The system can tender out the load based on criteria such as any terminal with containers dwelling greater than two day, the current volume of containers available, the current wait time trending, and the volume forecasted to be available. The system can send a one way tender to the drayage company. As the load is aggregated within a flow stack, the container identification and destination details are not yet known. FIG. 14 illustrates an example of a system interface screen 536 with a one way tender of a full load. It will be appreciated that the steps described herein can be completed manually in the system if the drayage company does not have EDI connectivity.

Once the load has been tendered to the drayage company, it can execute the load with its driver in any desired manner, for example, using its preexisting TMS. The driver can be offered to pick up a load at a specific terminal, which the driver can accept or reject. If accepted, the driver executes the pick up by driving to the identified terminal. Once the driver receives the container, the driver can notify the drayage company dispatcher of the container number. The dispatcher can look up the container and receive the destination via the system. FIG. 15 illustrates an example of a system interface screen 538 in which destination details are shown for an entered container identification number. The dispatcher can immediately request an updated tender, which the system can send to the drayage company's TMS. In some embodiments, the details can be pushed to the driver.

The system can also provide an indication of the availability of one or more empty returns, creating a round trip, also shown in FIG. 15. Once a return load is selected, the return load is tendered out based on criteria such as an opportunity for an export street turn, containers nearing their last free day, the volume available at return terminal for pick up, current wait time trending, and volume forecasted to be available. In some embodiments, when the dispatcher receives the destination of the return load, the system can present two or more options such as returning an empty container to a terminal, or an export street turn. If a street turn is accepted, two moves can be sent to the drayage company: importer to exporter and exporter to terminal. The system tenders the return load(s), with details, to the drayage company, and the drayage company can tender to the driver.

In some embodiments, when freight from multiple importers is to be aggregated across terminals, the system can advise the drayage company at what terminal to pick up containers next based on criteria including the time the containers have been dwelling in the terminal, the highest current volume available, the longest current wait time trending, and the highest volume forecasted to be available.

For full loads in off dock yards, the containers are no longer in stacks. At this point they are wheeled on chassis. Individual containers can be scheduled for delivery and unique container numbers can be requested and picked up. The contributing drayage company can claim the container within the system and pick up the container when it is ready. If the drayage company would like to have someone else in the network subhaul the load for it, it can reallocate the load to another drayage company who can then claim and pick up the container.

In some embodiments, executing a load tender can occur within the drayage company's TMS. The drayage company can use its own TMS to dispatch one way full moves for their acceptance of the load. When dispatching, drivers see that they are going to Terminal XYZ, but do not see a container number and destination. Upon arriving at the terminal, drivers can inform the terminal operator that they are arriving for the flow stack. As the driver picks up the container, queue time, gate in and gate out can be tracked as there is a load from the system being executed. Upon receiving a full container, the driver contacts the dispatcher and advises the load number and container number. The dispatcher then enters the system portal and enters the system load number and container number to "claim" the container. This enables the system to determine which drayage company has picked up which container and also enables an updated notification to be sent to the drayage company for that load. In some embodiments, described further below, the system can provide a mobile application by which the driver can enter the load and container numbers directly into the system. Once a load is claimed, an updated notification for the previously sent tender with container number, seal, destination, and any other needed information can be sent to the drayage company to eliminate manual updates and entry in the drayage company's TMS.

As empty containers become available to return to the terminal, the system can facilitate the opportunity for providing a round trip the driver. When requesting a full container, the dispatcher of the drayage company can be presented with opportunities for a container to return, creating a round trip. More particularly, upon dispatch receiving the destination, two options can be presented: an empty to return to terminal, or an export street turn to execute (if available). If a street turn is accepted, two moves can be sent to the drayage company, Importer to Exporter and Exporter to Terminal. The system can also facilitate the communication and financial reconciliation, two elements of street turns that are at present challenging for the industry. In particular, the system can communicate street turns to carriers, and can distribute street turn savings to participants.

An empty container dispatched for a street turn or empty return to terminal can be based on the criteria such as containers nearing last free day, volume available at return terminal for pick up, current wait time trending, and volume forecasted to be available. The system can dispatch one way moves to the drayage company's TMS. In the case of empties, the specific container numbers and associated information (such as destination) can be sent with the tender, not TBD (to be determined), as with a full load.

Empty returns back to an off dock location can be handled directly by the contributing (or subhauled) drayage company. The system can keep track of the gate out and gate in milestones at the off dock location, while depending on the drayage company to return the empty container back to the off dock location. Once the container has been returned empty (or full in the case of an export), the container can be included in the empty return volume to be used as round trips for containers pulling off the port.

In some embodiments, the system can incorporate containers being offhired, i.e., containers taken off lease from the ocean carrier for return to a leasing company, an obligation put on the drayage company when managing the container off dock. Handling offhires has been a challenge, because it can be unclear where to return the empty container. Ocean carriers often change where the empty container can be returned while the container is out. The system can receive updates providing acceptable return locations, which can benefit the drayage community by reducing time and cost related to the empty return process.

As a drayage company executes a move, it can send status messages to the system. Terminal-related milestones (for either a full pick up or an empty return) can include date and time of arrival in queue, date and time of gate in, date and time of gate out, and date and time of delivery of empty. Distribution center-related milestones can include delivery date and time (for a full delivery), and pick up date and time (for an empty return). Milestones should be transmitted to the system promptly within completion of the milestone, such as within 30 minutes. From these updates, the system can communicate status updates to the contributing drayage company.

Specific to an empty return, the system can verify with the terminal that the container has been returned. Once confirmed, the system can communicate the empty return milestone to the drayage company.

In some cases, the drayage company can be both the contributing and fulfilling drayage company. The system can handle this situation in the same manner with no additional work from the drayage company when executing its own contributed load. The system can reconcile that on the drayage company's behalf.

Once the drayage company communicates that the load has been delivered (and if empty, verified empty return with the terminal), the system can provide a financial reconciliation.

In some embodiments, the system can manage exceptions, such as when loads need to be un-allocated or a destination changes. For example, a drayage company dispatcher may have selected one too many containers and needs to return or potentially ask for support in subhauling. The dispatcher can select to "unallocate" freight that has already been accepted. The drayage company can still be obligated to pick up the contributed amount of freight but this can create an opportunity to reshuffle how containers are transported. As another example, a container could be damaged or a chassis could have a flat tire. The drayage company dispatcher can then have the ability to reject that empty and advise the reason for the rejection.

In some cases, empty containers can be required to be returned to a different location, either a different terminal or an offhire. The system can update those containers with a change of final destination as needed. Such changes can be handled individually or as a mass update (i.e., all empty containers intended to return to Terminal X must be returned to Terminal Y).

The system can track inbound vessels and containers as they near the port. For example, the arrival of the vessel at a terminal can be tracked via online web portals and in some cases, electronic data interchange (EDI) or other third party software to capture the data and transmit it to the system.

In some embodiments, the system can employ the American National Standards Institute (ANSI) ASC X12 document types for communications in the transportation industry. For example, document type 204 can be used for shipment information such as tender orders; and document type 214 can be used for status messages, such as milestones. In particular, the system can receive a 204 document type from a drayage company tendering a contributing load to the system. The system can send a 204 document type tender to fulfill a one way full or empty load. The system can send a 204 document type to update the fulfilling of a load with a container number and other relevant information. The system can send and receive a document 214 type with milestones to and from a drayage company. Milestones can include for a terminal (either a full pick up or an empty return) the date and time of a truck arrival in a queue, a gate in, a gate out, and delivery. For a distribution center, milestones can include the date and time of a full delivery and pick up for an empty return. Other formats can be used if desired.

The system can include any translation routines for translating from an EDI format into data usable by the system. Updates can also be entered by an administrator of the system 100, customers, the terminal operators, or the carriers. Updates can include information such as changes in the estimated arrival time of a vessel, changes to the port where the container is to arrive, changes to the destination for the cargo, and a hold placed on a container. The tracking of containers notes when each container is discharged at the port and when each container becomes available to be picked up. Status updates can be provided to the cargo owners.

Figure 16:
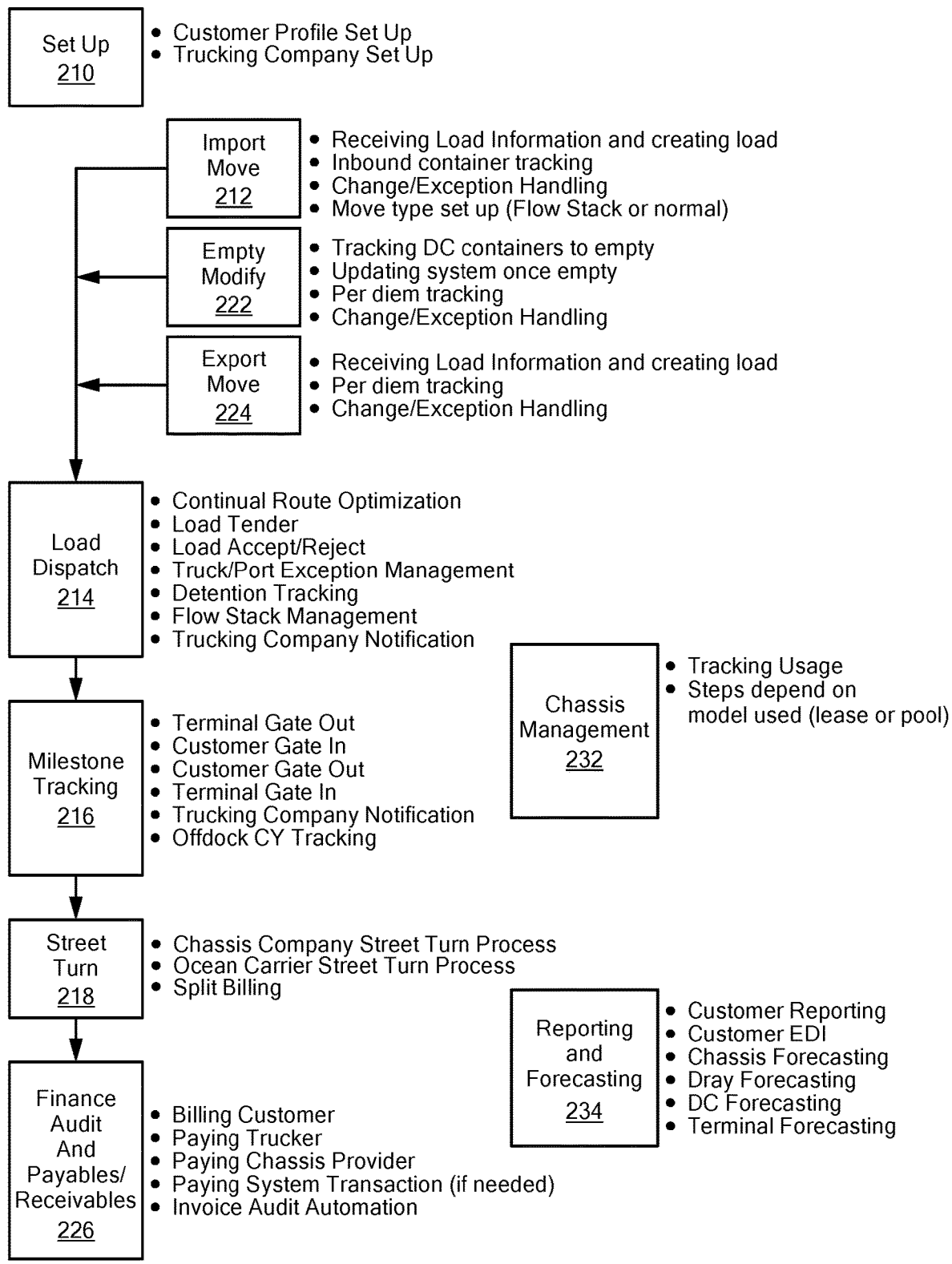
FIG. 16 is a block diagram of a further embodiment of a shipping container transportation coordination system.

Still further embodiments of the system can be described with reference to FIGS. 16-22B. One of skill in the art will appreciate that aspects, modules, and configurations of the embodiments described above are applicable to the embodiments of FIGS. 16-22B, and vice versa. For example, FIG. 16 illustrates that the system 100 can include a set up module 210, by which users can set up an account and profile and which can allow users to update the system with appropriate data at various times, as described above. The system described can similarly include a set up module 210.

Figure 17:
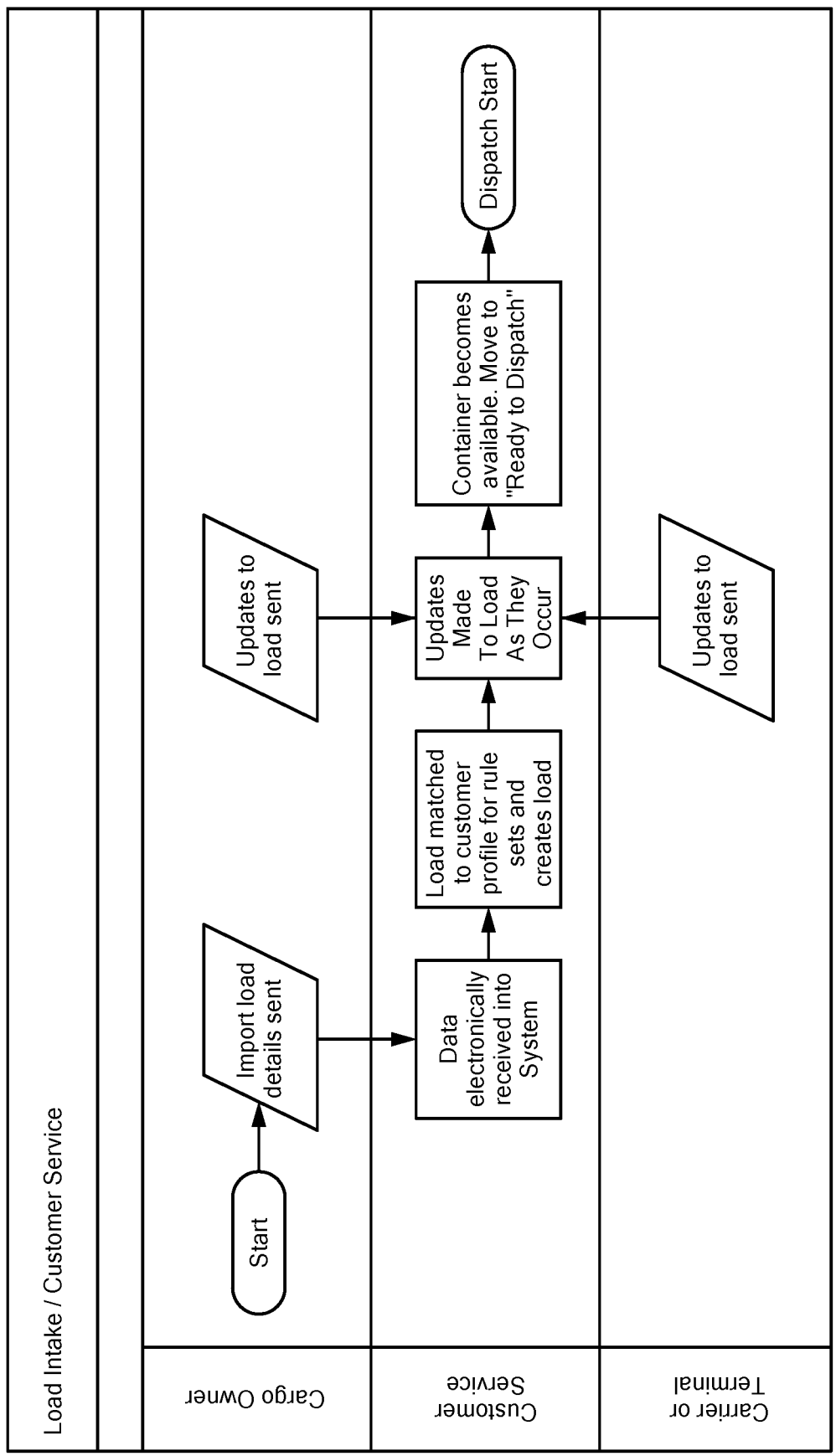
FIG. 17 is a schematic illustration of an example of a load intake.
Figure 18:
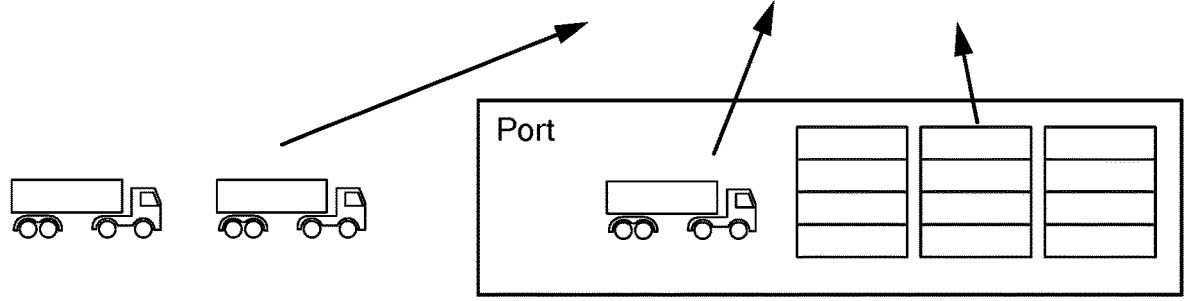
FIG. 18 is a schematic illustration of an example of route optimization.
Figure 19:
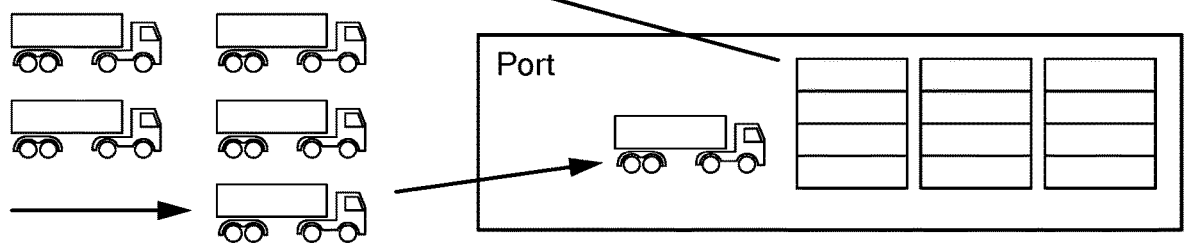
FIG. 19 is a schematic illustration of load order information transmitted to a driver via a mobile application.

Referring to FIGS. 16 and 17, the system can include an import move module 212 to coordinate the importing of a container. An import move transfers an arriving cargo-filled container from a vessel or train to a truck for delivery to a destination determined by the cargo owner. The cargo owner or other customer can log into the system to input information about an arriving container. The information can include a container identification, the name of the vessel carrying the container, the port where the vessel is expected to dock, and the estimated arrival time at the port. The module can match the container with the customer owner and create a "load order" for that container, described further below.

The import move module 212 can also determine the type of move out of the terminal, either from a flow stack or a standard move ("normal" on FIG. 16). When the container arrives at the port, it is unloaded from the vessel. In some embodiments, the container can be transferred to flow stacks in a rapid dispatch yard (RDY, also sometimes termed rapid discharge yard) with a dedicated gate or gates. The system can determine which containers should be transferred to the flow stacks and can inform the terminal operator which containers to transfer to the flow stack, if not already notified through block stow placement on the vessel. Containers that are not transferred to a flow stack can be unloaded normally and placed in the areas of the terminal for standard pick up.

When the container has been unloaded from the vessel, it becomes available and ready to dispatch. In some embodiments, the system can include a load dispatch module 214 to create a load order, which is transmitted to a selected truck driver. More particularly, the load dispatch module can continually optimize the routes for all of the loads that it is coordinating. The route optimization algorithm can coordinate factors including number and locations of containers, trip duration, traffic, distances, number and identification of drivers, export street turn opportunities, containers that need to meet port cut off for export and last free day at port or at a distribution center, and each driver's current location and hours of service remaining per shift. The route optimization can use historical and real time data, for example, for traffic data. As one example of route optimization, referring to FIG. 18, the system can include data that shows 20 drivers are currently en route to and 20 drivers currently receiving containers at Terminal B, which has 50 available containers. Terminal C, however, has 125 available containers, but there are fewer drivers en route to or in process of receiving a container at Terminal C. Thus, the system can reprioritize drivers to direct more drivers to Terminal C. A number of suitable route optimization algorithms are known and in some cases are available commercially, such as Paragon Routing, RoutesSmart, and Omnitracs, which can be used and/or modified as needed.

Based on the optimized routes, the load dispatch module can transmit a load tender to a drayage company and/or to a truck driver, who can accept or reject the load. By providing a driver with a single load tender for acceptance or rejection at a time, the system can control the balance of the loads among drivers and destinations. The module can receive updates regarding changes or exceptions to the load, such as a container needing to be picked up at a customs exam station, or a container has been damaged and can no longer be picked up. The module can perform detention tracking, by determining the time the load is out of the port. The system can manage the order of moving the containers and can provide notifications to the drayage company.

In some embodiments, the system can send data and instructions to the driver's mobile application to display information 213 such as the distribution center address and a contact name and phone number. See FIG. 19. The mobile application can also display to the driver any detailed distribution center requirements, which can benefit drivers who are not yet familiar with a particular distribution center. For example, requirements can include the street address or location of a check in gate and special instructions, such as no parking in front of the building.

In some embodiments, the load dispatch can determine that a container needs to go to a container yard (CY) first for temporary holding, before final delivery to a distribution center. This can be useful if, for example, a distribution center is temporarily full and cannot receive another container until later.

In some embodiments, the system can track the number of available containers at each terminal and the number of drivers en route to or in process at each terminal. Based on these data, the system can recommend to a particular driver to go to a particular terminal for pick up, for example, to a terminal that has a larger number of available containers and/or fewer drivers en route or in process.

In some embodiments, the system can include a tracking module 216 that can record various milestones of each truck driver. The milestones include leaving the port, "Terminal Gate Out"; entering the customer's facility, such as a distribution center, "Customer Gate In"; leaving the customer's facility, "Customer Gate Out"; and entering the port, "Terminal Gate In." Additionally, the tracking module can send notifications to the trucking company of the milestones of each truck driver associated with that trucking company. The tracking module can also keep track of truck drivers entering and leaving off dock container yards. Since the system also knows whether a truck driver is transporting a load, this tracking module in effect can keep track of each load during transit.

In some embodiments, the system can provide a street turn module 218. Typically, a truck driver delivers a full container to a first import customer facility and then picks up and returns an empty container back to the port. In a separate trip, a truck driver, who may be a different driver, possibly with a different trucking company, picks up an empty container at the port and drives the empty container to a second export customer facility so that the second customer can fill the container for export.

In some cases, it may be more efficient for a single driver to pick up an empty container at an import customer's facility immediately after delivery of a full container, and take the empty to an export customer's facility. This is known as a street turn, or triangulation. However, the importer and the exporter may use different trucking companies, which discourages collaboration. Also, while systems exist that notify drivers that an exporter is looking for an empty container, it is up to the driver to then contact the exporter directly to negotiate a one-time assignment.

The street turn module can include data from many customer facilities, including importers and exporters, and can determine that an optimum route is for a driver to deliver an empty container from the first import customer's facility directly to the second export customer's facility, instead of returning the empty container to the terminal. The system can allow the driver to accept the tender, as described above, directly through the driver's mobile application. The street turn module can increase the rate of street turns from the present rate of about 5% to about 20%. This can result in significant reduction in miles driven.

In some embodiments, the system can include an empty container notification module 222. The system can track empty containers efficiently. Each container has a unique identification. Once a container is delivered to a distribution center, the container is emptied by the customer. The customer then updates the system to indicate that the container's status is empty and ready for pick up for return to a terminal.

Containers are owned by the ocean carriers, which allot each container a certain number of days out of the port before the container must be returned. If a container is not returned within the allotted time, the customer is charged a per diem fee by the carrier. The system can track the number of days each container is out of port and can prioritize the return of containers to minimize any per diem charges. The system can also handle updates with changes or exceptions to the handling of each container, such as changes in destination location for an empty container.

In some embodiments, the system can include an export move module 224 to coordinate exporting a container from a customer's facility. The module can receive load information from the customer and create a load order. The system can query the database for the location of empty containers to determine an optimized route for delivering an empty container to an exporter. By optimizing the use of containers for export moves, rather than merely returning empty containers directly back to the port, the per diem charges and empty miles driven can be minimized.

In some embodiments, the system can include a chassis management module 232 to track usage of each chassis. The usage of a chassis can depend on whether a lease model or pool model is used. Some chassis are owned by a chassis provider, which can lease them out. Some trucking companies can add their own chassis to a collective system. In some embodiments, the system can coordinate the leasing of chassis directly. For any model, the system can handle tracking, managing, forecasting, and payment/receivables for the chassis use.

Figure 20A:
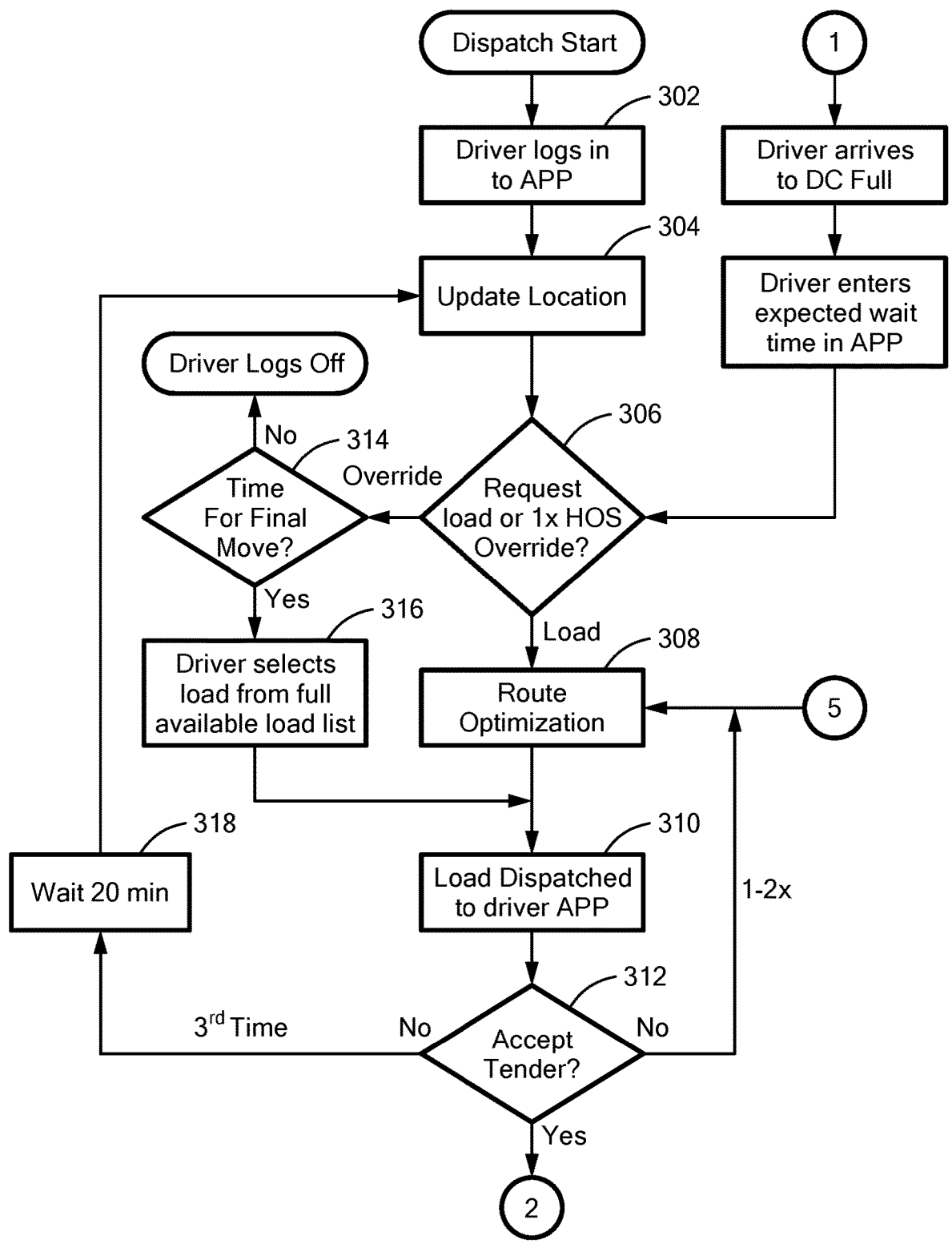
FIGS. 20A-20C illustrate a schematic flow chart of an embodiment of a method of coordinating transportation of shipping containers.
Figure 20B:
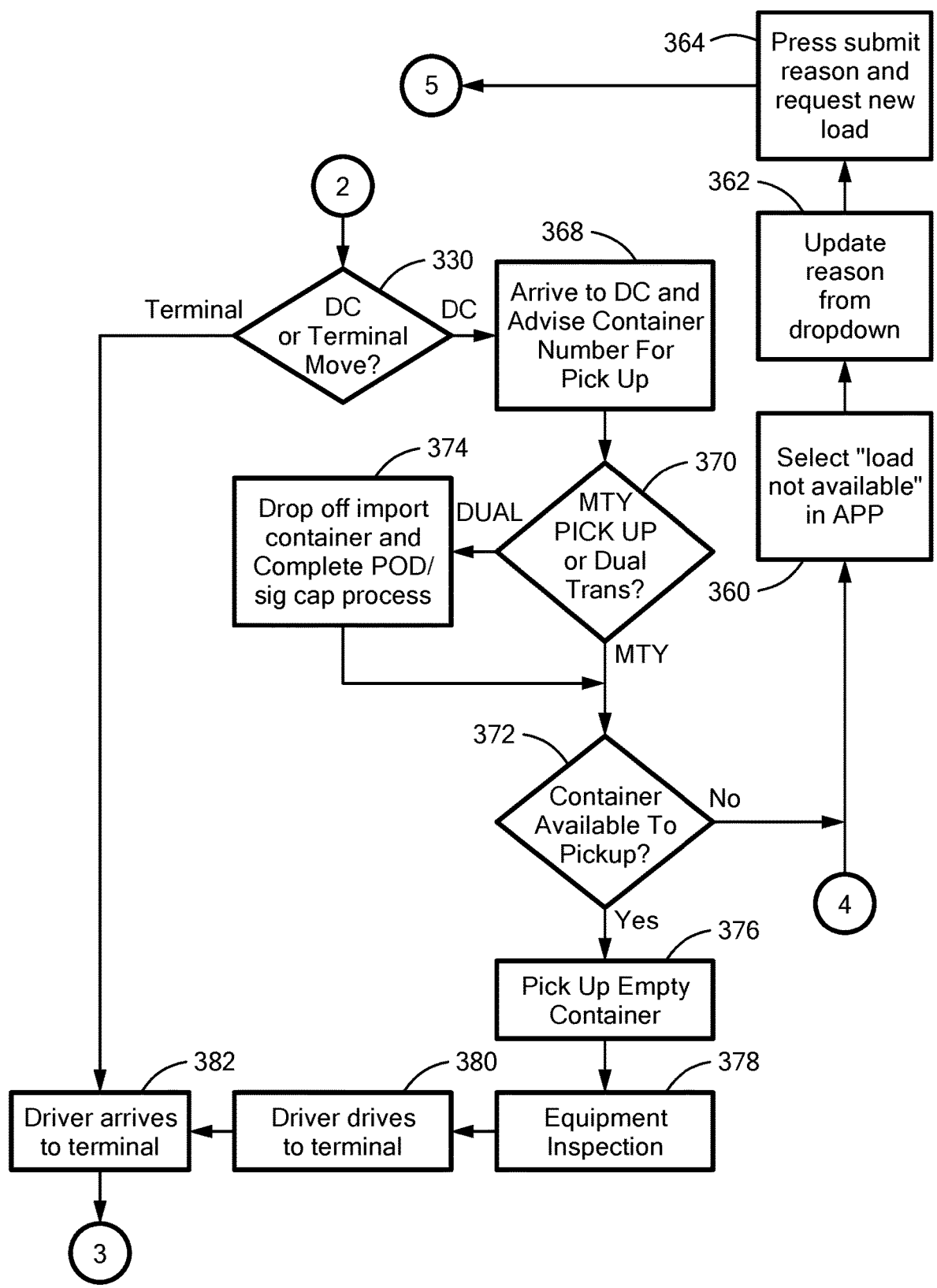
Figure 20C:
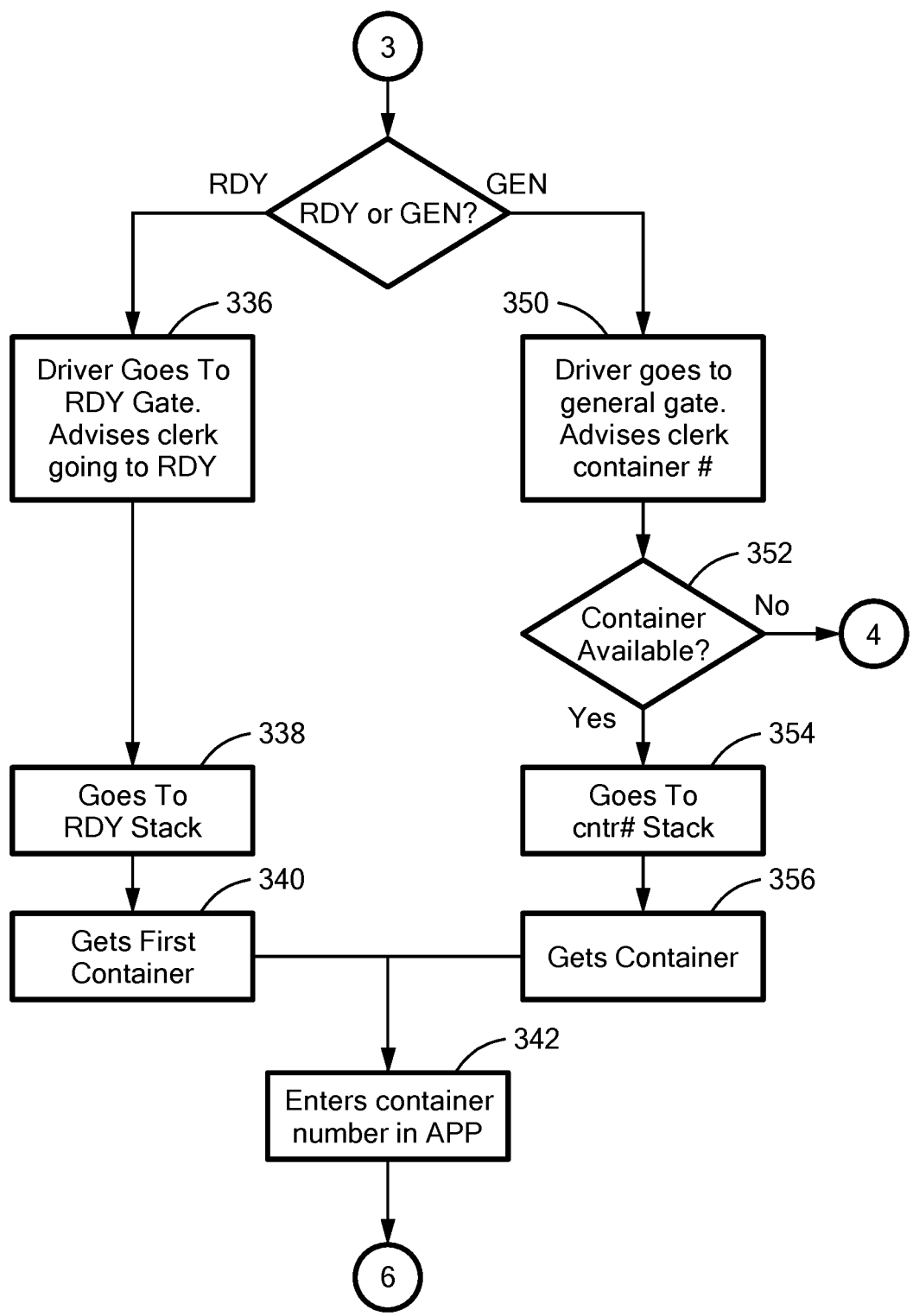
Figure 20C:
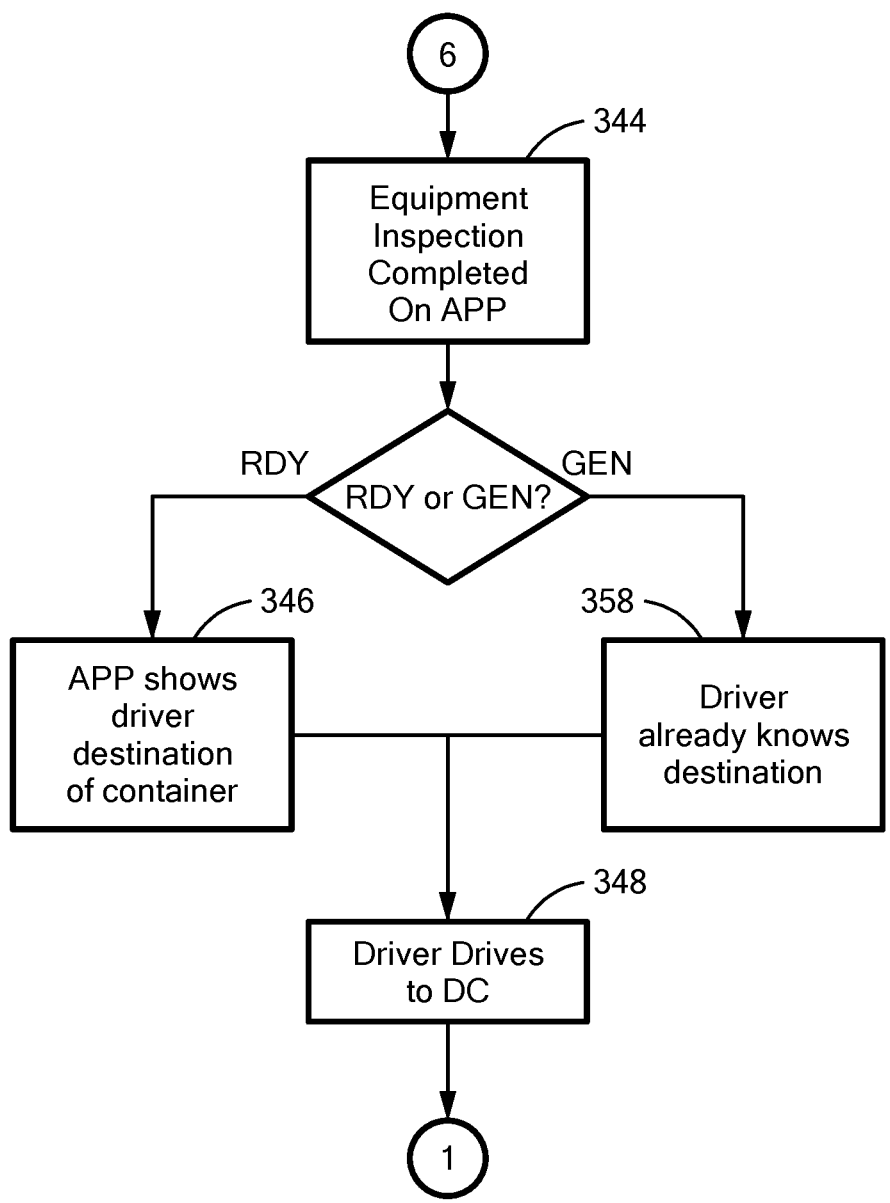
Figure 21E:
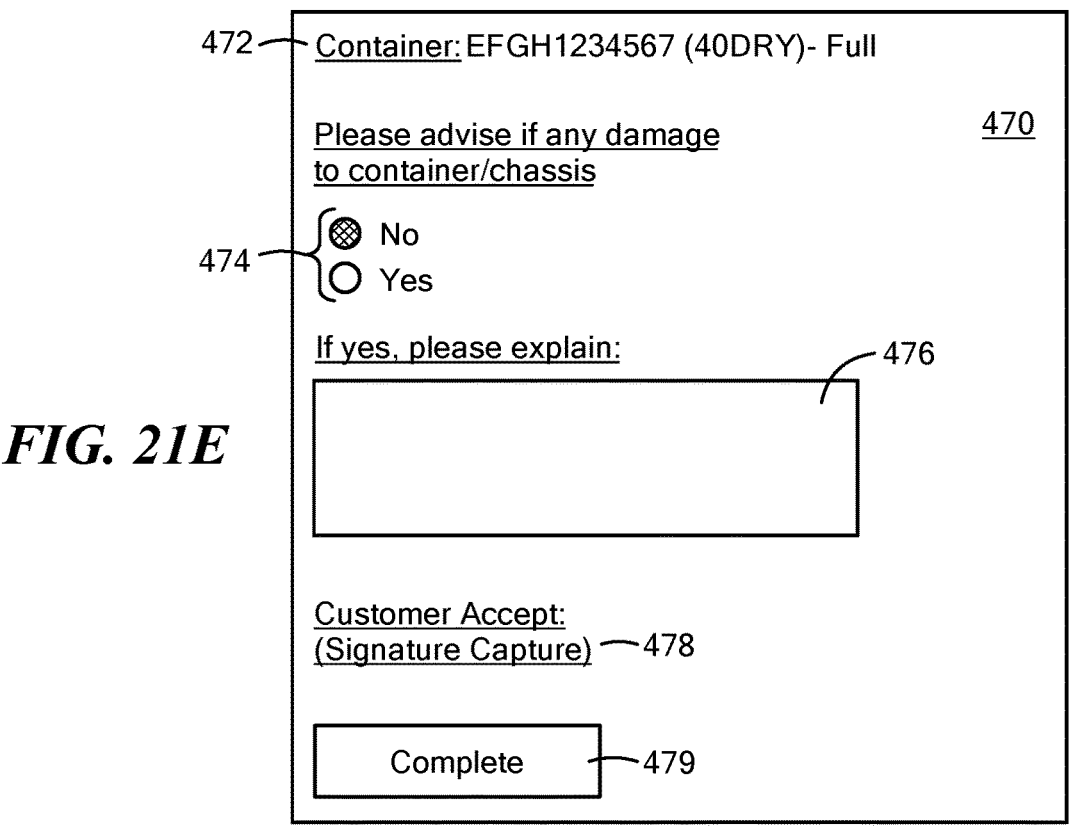
Figure 21F:
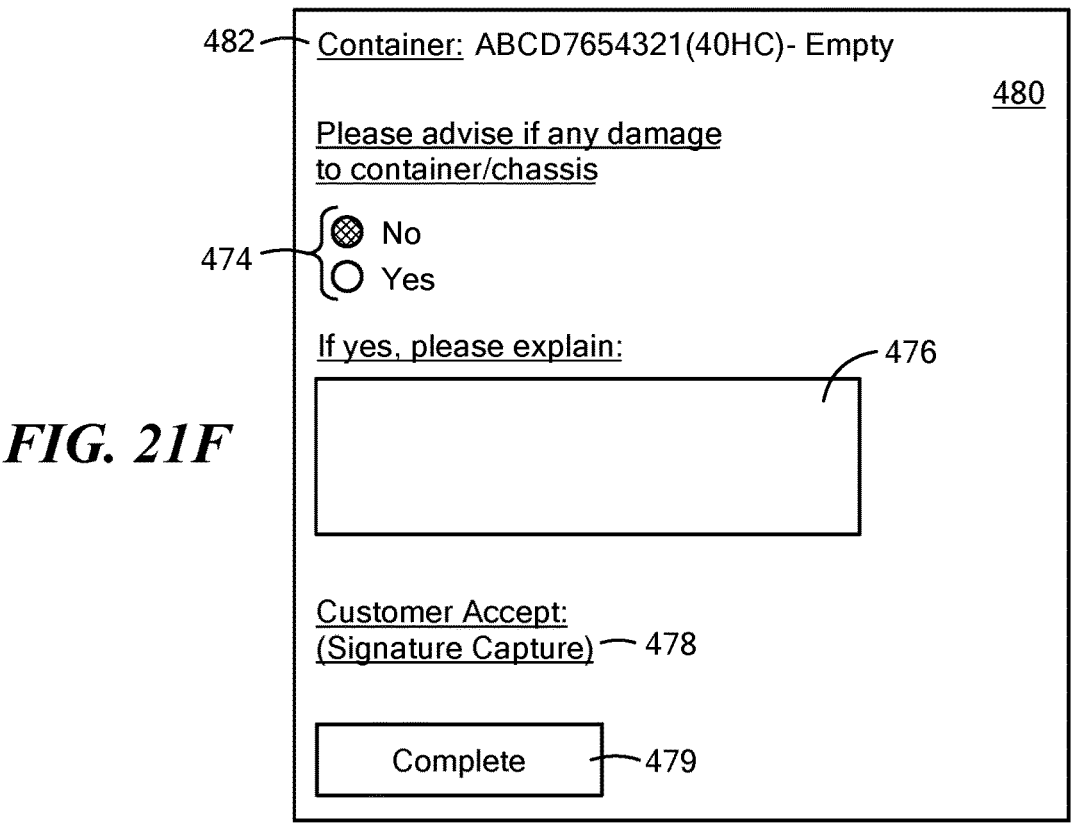
Figure 21G:
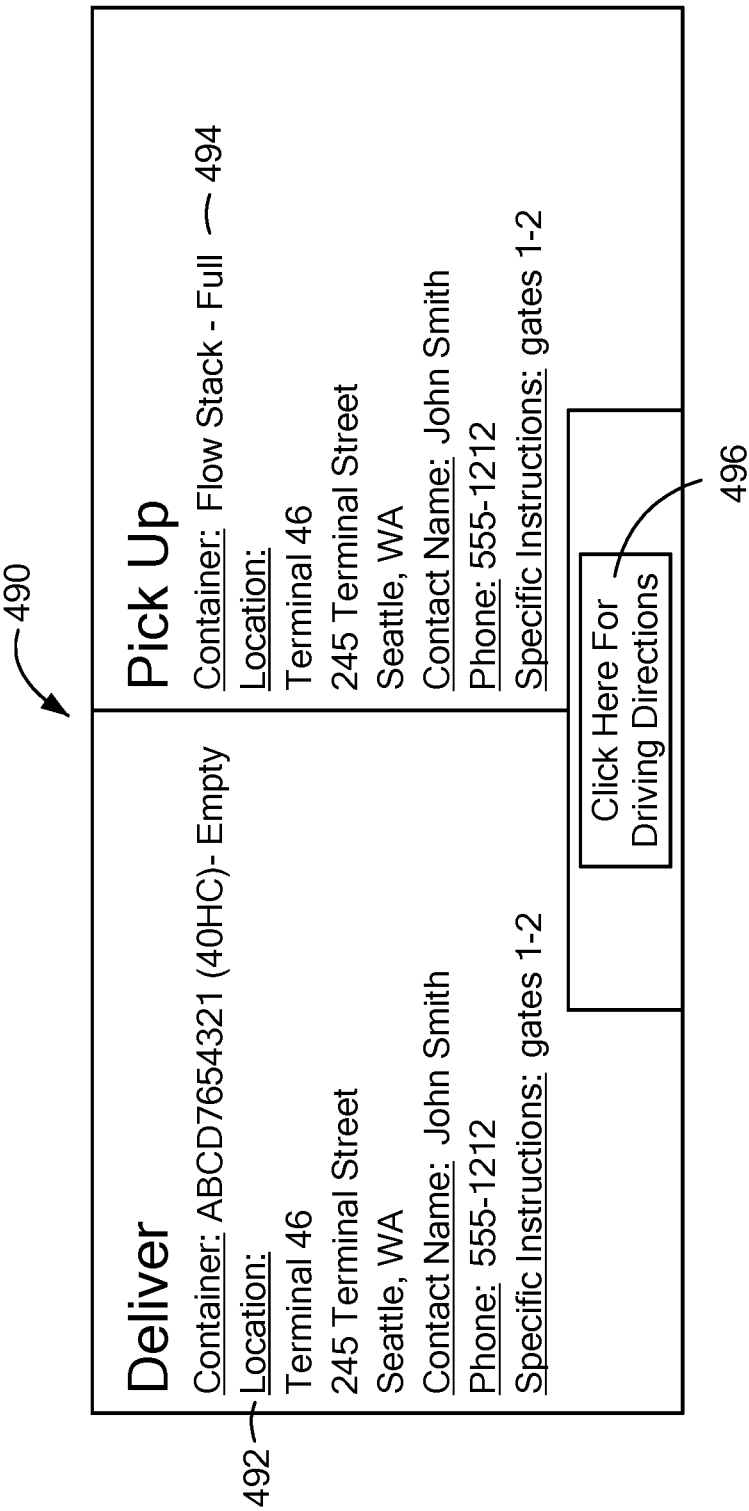

One embodiment of a system and method for coordination of the importing of cargo is illustrated with reference to FIGS. 20A-20C. An import move dispatch can provide a driver with one or two options: pick up a container loaded with cargo from a terminal for transportation to a cargo owner's distribution center or pick up an empty container from a cargo owner's distribution center for return to a terminal.

A dispatch process begins with each driver logging into the system 302, for example, using a mobile application on the driver's mobile computing device. The application can send a communication updating the driver's location 304 to the system. The driver's location can be entered directly by the driver and/or can be determined using a global positioning system. The driver can send a communication requesting a load 306.

The system receives driver updates and load requests from multiple drivers and can determine an optimized route for each load 308, that is, each container in the system's database of containers available for transport, using the data regarding the available drivers. For each container, the system sends a communication to a selected driver with a load tender 310. The driver can accept or refuse a load tender 312. If the driver accepts a tender, the driver drives to the appropriate location 330, such as a terminal, a distribution center, an off dock container yard, or a customs exam station.

In some embodiments, a driver can request an hours-of-service (HOS) override once per shift 306. For example, this can occur when the driver is nearing the end of a shift. Each driver is allotted a maximum number of hours before the driver must stop driving for safety reasons, and many drivers keep an electronic log book of their hours. An hours-of-service override is a request by a driver to receive a load that would result in a sub optimum route, so that the driver will not exceed the maximum daily hours or possibly for other reasons. The driver can also indicate if this move will be the driver's final move for this shift 314. When an HOS override is requested, the system can present the driver with a list of available loads from which the driver can select 316.

In some embodiments, the system can give the driver a limited number of load tender refusals. For example, if the driver successively refuses two load tenders, the third refusal results in a delay 318, for example, of 20 minutes, before that driver is offered another load. After the delay, the mobile application sends an update of the driver's location to the system 304, and the driver can again request a load.

If the move is from a terminal, such as a seaport, the driver drives to the terminal and checks in 332. Upon checking in, the driver's date, time, and location data are transmitted to the system. This can be done via a global positioning system and/or by the driver submitting an update via the mobile application.

If the driver has been given a load from a flow stack and/or to a RDY gate if the flow stack is located there, the driver advises the clerk at the terminal gate 336 and proceeds to the flow stack 338. The first container on the flow stack is loaded onto the driver's chassis 340. The driver enters the container number in the mobile application 342. An equipment inspection can also be completed on the application 344. An equipment inspection entails an inspection by the driver of the chassis and the container for any damage or unreasonable wear and tear. If any defects are found, the driver can make a note of them. The driver can also take a photograph(s) and upload the photograph(s) to the system via the mobile application. The application then informs the driver of the destination of the container 346, and the driver then drives to that destination 348.

If the driver has been given a load that is not in a flow stack, the driver is also given the container number and destination with the load tender. The driver advises the clerk at the terminal gate of the container number 350. The clerk determines if the container is available 352. If the container is available, the driver proceeds to the general gate 354 and the container is loaded onto the driver's chassis 356. The driver enters the container number in the mobile application 342. An equipment inspection is also completed on the application 344. The driver already knows the destination 358 and then drives to the destination 348.

If the container is not available 352, the driver selects "load not available" in the mobile application 360. A drop-down menu appears listing possible reasons for the container's unavailability, and the driver selects the appropriate reason 362, such as the container is located in a closed area, the container cannot be found, or the container is damaged. The driver then requests a new load 364. The system determines a new route optimization 308 for the driver based on the driver's location at the terminal, and the process repeats with the driver's acceptance or refusal of the load tender.

Upon arrival at the destination, such as a distribution center, with a full container, the driver checks in with the clerk, and the date, time, and driver's location data are transmitted to the system. In some cases, the driver arrives with a full container for delivery, and in other cases, the driver arrives to pick up an empty container 370 without delivery of a full container. If delivering a full container, the driver can enter an expected wait time for unloading the container at the distribution center into the mobile application, which is transmitted to the system. The driver can then request another load, or a one-time hours-of-service override. If the driver requests an HOS override, the driver can indicate if this is time for a final move for this shift.

If arriving to pick up an empty container (MTY), the driver drives to the distribution center and similarly checks in with the clerk. The driver advises the clerk of the empty container number for pick up. If the driver is also delivering a full cargo container to the distribution center for drop off prior to picking up the empty container, known as a dual transaction, the driver delivers the container 374, as described above. The clerk determines if the empty container is available for pick up 372. If the container is available, the container is loaded onto the driver's chassis 376. The date, time, and driver's location data can be transmitted to the system. The driver can also update the system that the load is received. An equipment inspection can also be completed on the mobile application 378. The driver then drives to the terminal 380 to deliver the empty container to the container yard or to another determined location.

If the empty container is not available when the driver gets to the distribution center, the driver can select "load not available" in the mobile application 360. A dropdown menu can appear listing possible reasons for the container's unavailability, and the driver can select an appropriate reason, as noted above. The driver can then request a new load 364. The system can determine a new route optimization 308 for the driver based on the location at the distribution center, and the process can repeat with the driver's acceptance or refusal of the load tender.

When the driver arrives at the terminal with the empty container, the driver checks in with the clerk at the gate and goes to the container yard to drop off the empty container. Then the driver proceeds to the rapid discharge yard or to the general yard to pick up a new container, as determined by the system. The process can follow the steps indicated above.

One embodiment of a mobile application interface is illustrated in FIGS. 21A-21G. The driver can log on via the mobile application, update the current location, and request a load. The driver can request a first move closest to the current location or starting at a specific location. The system can send a recommended load tender to the driver's mobile application. The application can provide a display 402 (FIG. 21A) that includes pertinent information about the load tender. The display can include information about the container 404, the location 406 of the container, a contact name 408 and phone number 410 at that location, and any specific instructions 412. The display can also provide the driver the option of accepting or rejecting the load, for example, via buttons 414, 416. In the example illustrated in FIG. 21A, the load is a full container located in a flow stack at Terminal 18 in Seattle, WA Specific instructions inform the driver which gates to use. It will be appreciated that the load can also be in a flow stack integrated within the general yard.

Upon accepting the load tender, the driver drives to Terminal 18, checks in as described above, and takes the first available container. The driver can enter the container number via the application. A second display screen 420 (FIG. 21B) can show the container number 422 and ask if there is any damage to the container or the chassis, for example, via "Yes" or "No" radio buttons 424. If damage is apparent, the driver can enter an explanation in a text box 426. The driver can then select "Complete" via a button 428.

A further screen 430 (FIG. 21C) with the destination for the container can appear. The display can include the container number 423, the name and address 434 of the destination, a contact name 436 and phone number 438, and in some cases, specific instructions 440. The driver can request driving directions via a button 442. The driver then drives to the destination, indicated as "DC 123" in the example.

The driver can notify the system upon arrival at the destination, DC 123, via the application. The system can then send another load tender to the driver. In the example shown, a display screen 450 (FIG. 21D) shows a load tender for an empty container 452 to be picked up from the driver's current location at DC 123 for delivery to a destination 454, in this case, at Terminal 46 in Seattle, followed by another pick up of another container 456 from the same location 458, at Terminal 46. The driver can accept or reject the load tender via buttons 460, 462.

Upon delivery of the first container to DC 123, the driver can notify the system that the container has been delivered. The system can provide another screen 470 (FIG. 21E) with information 472 about the container and again requests if there is any damage to the container or chassis, for example, via "Yes" or "No" radio buttons. If damage is apparent, the driver can enter an explanation in a text box 476. The system can provide a signature capture area 478 on the display for a signature by the customer to indicate acceptance of the container. The driver can then select "Complete" via a button 479.

The system can then provide a screen 480 (FIG. 21F) with information 482 for the empty container to be picked up. Again, the system can request if there is any damage to the container or chassis, for example, via "Yes" or "No" radio buttons 484. If damage is apparent, the driver can enter an explanation in a text box 486. The system can provide a signature capture area 488 on the display for a signature by the customer to indicate assent to return of the container. The driver can then select "Complete" via a button 489.

A further display screen 490 (FIG. 21G) can then be provided with the delivery destination 492 of the empty container and information 494 regarding the next container for the next pick up. The driver can request driving directions via a button 496. The driver then drives to Terminal 46 to deliver the empty container.

Figure 22A:
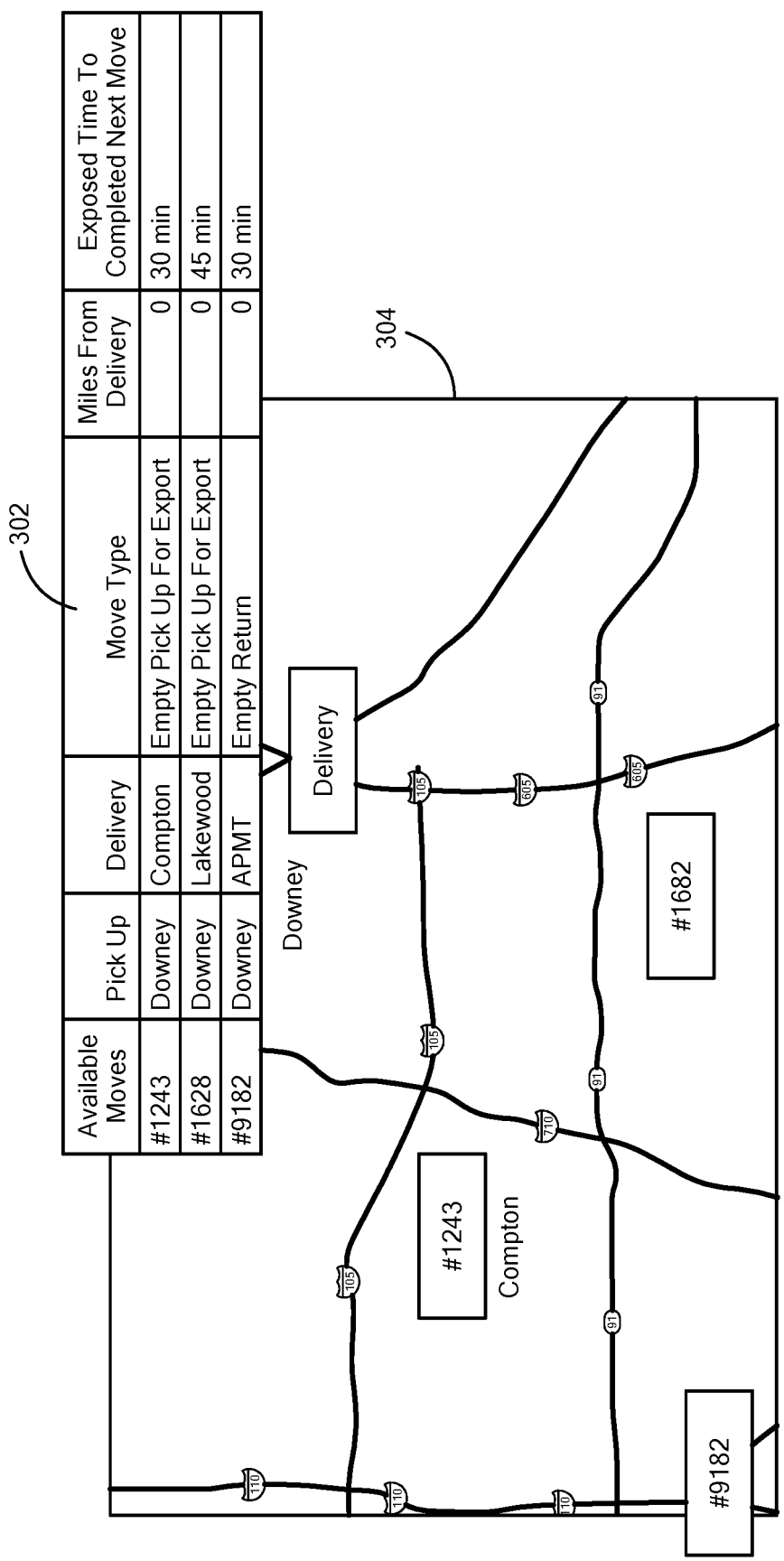
FIGS. 22A-22B schematically illustrate further aspects of an embodiment of a mobile application.
Figure 22B:
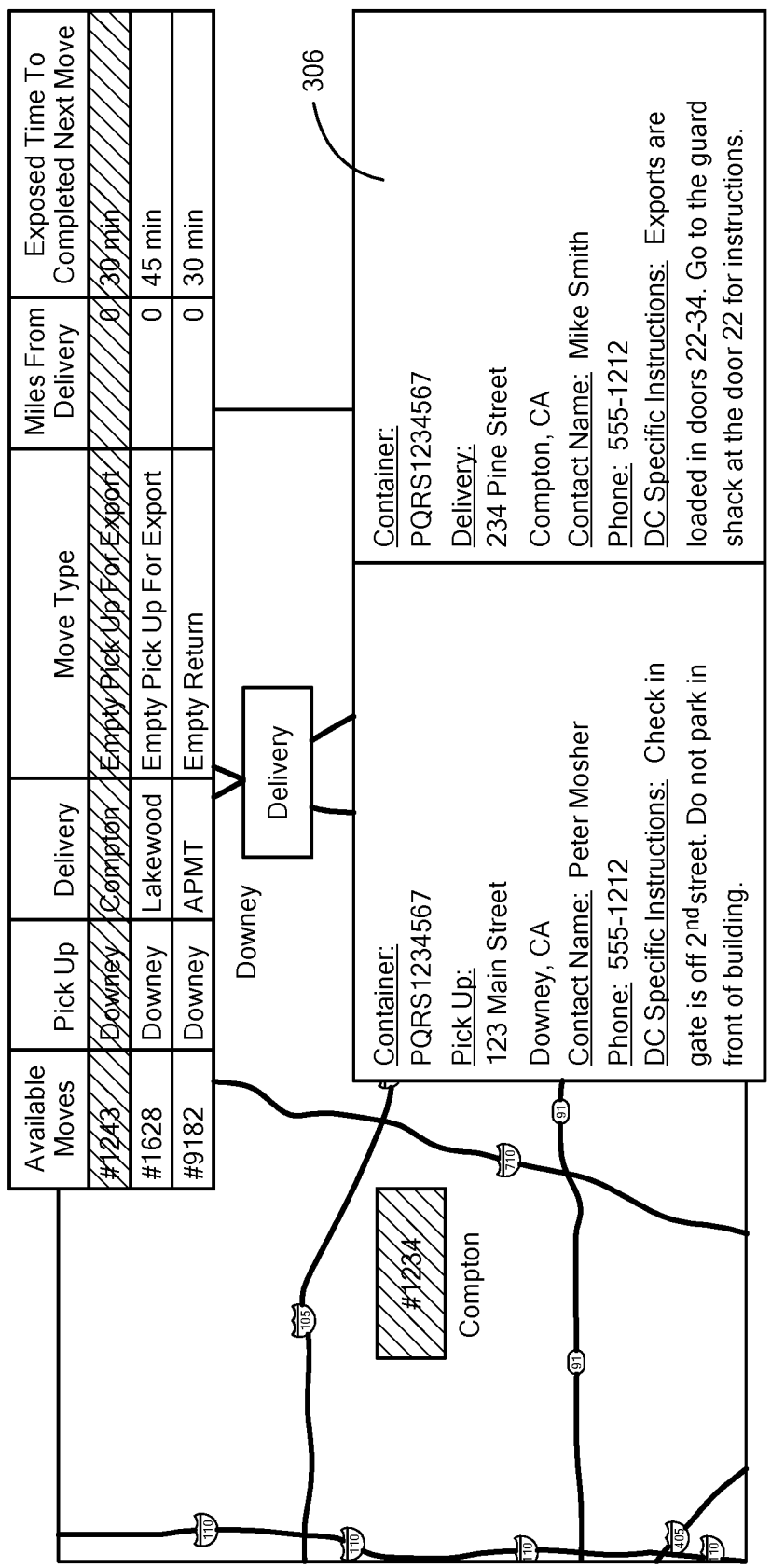

As noted above, a driver can request an hours-of-service (HOS) override. In this case, the system can provide the driver with several moves, from which the driver can select. See FIG. 22A. In some embodiments, the mobile application can also display a map showing the locations of the destinations. In the example shown, a display 510 provides the driver with a choice of three available moves from the driver's current location (123 Main Street in the example shown). For a selected move, such as move #1243 in the top row, the system then displays via the mobile application the details 512 of the pickup location and the delivery location (FIG. 22B).

Data transmitted from the mobile application to, for example, the central server of the system can be stored and provided to other users of the system. For example, users can record results of import load container inspections and seal numbers. Users can receive real time confirmation of delivery of a container. The signature capture capability can allow the system to provide delivery receipts and equipment interchange receipts.

In some embodiments, the system can include a finance module 226 to manage financial aspects of the transportation of containers. See FIG. 16. The system can determine appropriate fees based on container milestone tracking and driver hours. The system can bill and receive payment from each customer and can transmit payment to the trucking companies, chassis providers, and ocean carriers.

In some embodiments, the system can implement a zone-based fee schedule. As noted above, distribution centers can be located at various zones depending on their distances from a terminal. Deliveries to any location within a single zone are charged a same fee. Deliveries to locations in zones farther from the terminal are charged a greater fee than deliveries to locations in zones closer to the terminal. The system can track the zone to which each container is delivered and can bill the customer appropriately.

In some embodiments, the system can track the time that a container has been out of a terminal, which determines the per diem charge that a cargo owner must pay to the carrier that owns the container. In some embodiments, the system can bill and receive payment from the cargo owner and can transmit payment to the carrier for such container per diem charges. The system can allocate fees and payments in split billing situations, such as with a street turn, in which an importer and an exporter may split a payment to a trucking company.

In some embodiments, the system can facilitate the compensation arrangement when participating drayage companies share execution of a load. The system can employ an exchange rate as a one way rate as a mechanism for Drayage Company A to compensate Drayage Company B when Company B executes a load for Company A. The exchange rate can also provide a mechanism for sharing in the export street turn savings. In some embodiments, the exchange rate can be established on a mileage zone or band basis. For example, trips within a range of 0 to 10 miles can have a first rate; trips within a range of 11 to 20 miles can have a second rate, and so on for as many mileage bands as desired.

In some embodiments, the system can provide a financial reconciliation, for example, for a predetermined time period, such as every week. For example, at the close of every week, the system can generate a summary statement from the previous week's activities.

Each contributed load can count as two one-way moves and each fulfilled load can count as one one-way move as the full and empty legs are separate moves when being executed. The system can invoice and pay the proper parties on a weekly basis.

An example is provided as follows, assuming (for example purposes) each 1-way move is $50. For full container moves:

Drayage Company A contributes 100 containers

Drayage Company B assists Drayage Company A with 20 containers

Drayage Company B contributes 75 containers

Drayage Company a Assists Drayage Company B with 10 Containers

Drayage Company a Executes the 90 Containers (80 Theirs/10 Others)

Drayage Company B Executes the 85 Containers (65 Theirs/20 Others)

|  | Contributed | Executed | Owes | $ Per Move | Total Owes |
|---|---|---|---|---|---|
| Drayage Company A | 100 | 90 | 10 | $50 | $500 |
| Drayage Company B | 75 | 85 | −10 | $50 | ($500) |

Drayage Company A owes E*DRAY $50×10 moves=$500

E*DRAY owes Drayage Company B $50×10 moves=$500

For empty container moves:

Drayage Company A requests 90 empty containers to return

Drayage Company A receives and executes 45 empty containers it contributed as full Drayage Company A receives and executes 45 empty containers that Drayage Company B contributed as full Drayage Company B requests 85 empty containers to return Drayage Company B receives and executes 49 empty containers it contributed as full Drayage Company B receives and executes 36 empty containers Drayage Company A contributed as full

|  | Contributed | Executed | Owes | $ Per Move | Total Owes |
|---|---|---|---|---|---|
| Drayage Company A | 81 | 90 | −9 | $50 | ($450) |
| Drayage Company B | 94 | 85 | 9 | $50 | $450 |

Drayage Company B owes E*DRAY $50×9 moves=$450

The system owes Drayage Company A $50×9 moves=$450

Summing the full container charges, the total for the week is as follows:

|  | Contributed | Executed | Owes | $ Per Move | Total Owes |
|---|---|---|---|---|---|
| Drayage Company A | 181 | 180 | 1 | $50 | $50 |
| Drayage Company B | 169 | 170 | −1 | $50 | ($50) |

Drayage company A owes the system $50

The system owes Drayage Company B $50

The system can account for other costs as well. For example, fuel usage can be compensated as a percentage of the exchange rate and can be variable by zone. Assessorials such as wait times can be tracked and invoiced to the appropriate party. Trucks that pull no load back to a terminal, termed a "bobtail," can be tracked and assessed in a manner similar to the exchange rate mechanism described above. A bobtail to another distribution center can be tracked and assessed based on length of trip; for example, a bobtail under 5 miles can be included in a one way rate, and a bobtail of a greater length can be assessed at another desired rate.

In some embodiments, the system can accommodate various chassis ownership and leasing arrangements that are typically used in the transportation industry. The system can monitor the chassis arrangement, track the chassis, and provide a financial reconciliation at periodic intervals. For example, in some chassis arrangements, the chassis is owned by a chassis leasing company and may be managed by a drayage company. In other arrangements, the chassis is provided by a steamship line, via a lease or an ocean carrier owning intermodal equipment provider. The system can track chassis usage and reconcile the financial arrangements between the parties.

In some embodiments, the system can provide reports to the various users. In some embodiments, the system can provide users the capability to create and schedule reports.

In some embodiments, the system can provide a report with a terminal overview containing data such as, without limitation:
- Count of containers on terminal
- Count of containers by days available (for example, 20 containers available for 1 day, 50 for 2 days, etc.)
- Current average dwell (average number of days dwell for containers currently on terminal)
- Any containers that show a day longer than the current average (to go back to the ports to advise lost/out of stack)
- Count of empty containers on the street by terminal to see round trip ability In some embodiments, the system can provide a report with a drayage company overview containing data such as, without limitation:
- Daily/weekly volumes and revenue/expense
- Contributed loads vs. picked up loads
- EDI performance (milestone completed vs. EDI received)
- Empty containers that the drayage company has claimed but do not show as picked up in 24 hours
- Any contributed loads on street more than a certain number of days, such as 20 days, and their status (empty/full)

In some embodiments, the system can provide a report with a distribution center (DC) overview containing data such as, without limitation:
- Count of containers at DC Full
- Count of containers at DC empty
- Average number of days at DC full (current containers)
- Average number of days at DC empty (current containers)

The system can be implemented as a computer system that executes programming for controlling the coordination of transportation of shipping containers, as described herein. The computing system can be implemented as or can include a computing device that includes a combination of hardware, software, and firmware that allows the computing device to run an applications layer or otherwise perform various processing tasks. Computing devices can include without limitation personal computers, work stations, servers, laptop computers, tablet computers, mobile devices, hand-held devices, wireless devices, smartphones, wearable devices, embedded devices, microprocessor-based devices, microcontroller-based devices, programmable consumer electronics, mini-computers, main frame computers, and the like. User devices for communicating with and interfacing with the system can similarly be implemented as computing devices as described herein.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used, including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, drivers, objects, components, data structures, and the like that perform particular tasks or operate on data.

Processors can include one or more logic devices, such as small-scale integrated circuits, programmable logic arrays, programmable logic device, masked-programmed gate arrays, field programmable gate arrays (FPGAs), and application specific integrated circuits (ASICs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the method and system described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in these embodiments.

The computing device can include one or more input/output interfaces for connecting input and output devices to various other components of the computing device. Input and output devices can include, without limitation, keyboards, mice, joysticks, microphones, displays, touch-screens, monitors, scanners, speakers, and printers. Interfaces can include universal serial bus (USB) ports, serial ports, parallel ports, game ports, and the like.

The computing device can access a network over a network connection that provides the computing device with telecommunications capabilities. Network connection enables the computing device to communicate and interact with any combination of remote devices, remote networks, and remote entities via a communications link. The communications link can be any type of communication link, including without limitation a wired or wireless link. For example, the network connection can allow the computing device to communicate with remote devices over a network, which can be a wired and/or a wireless network, and which can include any combination of intranet, local area networks (LANs), enterprise-wide networks, medium area networks, wide area networks (WANs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission of and receipt of data via the communications link.

The computing device can include a browser and a display that allow a user to browse and view pages or other content served by a web server over the communications link. A web server, server, and database can be located at the same or at different locations and can be part of the same computing device, different computing devices, or distributed across a network. A data center can be located at a remote location and accessed by the computing device over a network.

The computer system can include architecture distributed over one or more networks, such as, for example, a cloud computing architecture. Cloud computing includes without limitation distributed network architectures for providing, for example, software as a service (SaaS), infrastructure as a service (IaaS), platform as a service (PaaS), network as a service (NaaS), data as a service (DaaS), database as a service (DBaaS), desktop as a service (DaaS), backend as a service (BaaS), API as a service (APIaaS), and integration platform as a service (IPaaS).

The system can provide advantages by providing a single technological platform to coordinate operations across many users of different types. The system can efficiently handle load dispatching with optimized routes. The use of flow stacks can result in more efficient transport of containers. The system can provide for more efficient street turn executions, coordination of chassis, and management of exceptions or changes. The system can also integrate other services, such as accounts payable and receivable. The ability to store and track data can provide enhanced visibility, forecasting and analytics.

In some embodiments, the system can increase the time that a container becomes available at the terminal or destination by 30%. In some embodiments, the system can reduce container rehandling at a terminal or destination by 55%. In some embodiments, the system can increase the time truck drivers spend getting in and out of gates by 60%. In some embodiments, the system can reduce the number of trouble tickets by 75%. In some embodiments, the system can reduce the truck queue time at a gate by 30%. In some embodiments, the system can reduce the number of gate transactions by 20%.

In some embodiments, the system can provide 40% more moves for truck drives and can reduce network variability by 25%. In some embodiments, the system can provide 100% container tracking and 100% chassis availability tracking.

Further aspects of the invention are as follows:

1. A method for coordinating transportation of shipping containers through a terminal, the method performed by a computing system including memory and one or more processors, the method comprising:

receiving data identifying each of a plurality of shipping containers, a customer associated with cargo within each shipping container, and a destination for each shipping container;

providing, to a remote computing device operated by a first user, instructions for stacking at least a portion of the plurality of shipping containers in a rapid discharge yard;

receiving data including identification and location of each of a plurality of truck drivers available to transport shipping containers; and providing, to one or more remote computing devices each associated with one of the plurality of truck drivers, instructions to proceed to the rapid discharge yard to obtain a shipping container from a top of a stack.

2. The method of embodiment 1, further comprising receiving from the remote computer device associated with each truck driver a container identifier for an obtained shipping container from the rapid discharge yard, and after receipt of the container identifier, providing to the remote computing device associated with each truck driver a destination for the identified shipping container.

3. The method of any of embodiments 1-2, further comprising providing to the truck driver who has delivered the shipping container to the destination further instructions to obtain another shipping container for delivery to another destination.

4. The method of any of embodiments 1-3, wherein the destination is an importing customer facility, a distribution center, a transloading facility, a warehouse, or an offsite container yard.

5. The method of any of embodiments 1-4, further comprising providing to at least one truck driver instructions to obtain an empty shipping container for transportation to a destination.

6. The method of any of embodiments 1-5, further comprising providing to at least one truck driver instructions to obtain an empty container from the destination and deliver the empty container to a further destination.

7. The method of embodiment 6, wherein the further destination is a seaport terminal, a rail yard, or an exporting customer facility.

8. The method of any of embodiments 1-7, further comprising determining a route for each of the plurality of truck drivers based at least in part on number and location of full and empty shipping containers, number and location of truck drivers, and minimization of miles driven and idling time by each of the truck drivers.

9. The method of any of embodiments 1-8, further comprising receiving a notice of acceptance of the instructions from at least one of the plurality of truck drivers.

10. The method of any of embodiments 1-9, further comprising receiving a notice of rejection of the instructions from at least one of the plurality of truck drivers, and providing to the truck driver further instructions to obtain a different shipping container at a different location.

11. The method of any of embodiments 1-10, further comprising receiving a request for an hours of service override from at least one of the truck drivers, and providing to the truck driver a selection of shipping containers to pick up.

12. The method of any of embodiments 1-11, wherein the first user is an operator of a seaport terminal or a rail yard.

13. The method of any of embodiments 1-12, wherein the instructions for stacking at least a portion of the plurality of shipping containers in the rapid discharge yard include placing together a subset of the shipping containers that are intended for a single destination or a single zone.

14. The method of any of embodiments 1-13, wherein the data identifying each of a plurality of shipping containers is received from one or more of a vessel, an operator of a seaport terminal, an operator of a rail yard, an owner of cargo in one or more of the shipping containers, a non-vessel operating common carrier, a freight forwarder, or a steamship line.

15. The method of any of embodiments 1-14, further comprising:
  receiving, from a remote computing device associated with a trucking company, data identifying truck drivers who drive for the trucking company; and
  sending to the remote computing device associated with the trucking company data regarding milestones of each driver transporting a shipping container to a destination, and hours driven by each driver for a shift.

16. The method of any of embodiments 1-15, further comprising receiving from a remote computing device associated with an ocean carrier data regarding one or more of vessel arrival times, container discharge dates and times, container available dates, container holds, and container damage.

17. The method of any of embodiments 1-16, further comprising receiving from a remote computing device associated with a seaport terminal data regarding one or more of container yard available capacity, number and identification of empty containers, status of vessels, availability status of containers, and delay events.

18. The method of any of embodiments 1-17, further comprising collecting payment from cargo owners for receipt of a shipping container laden with cargo, and transmitting payment to trucking companies and to chassis operators.

19. A system for coordinating transportation of shipping containers through a terminal comprising:
  a computing system including memory and one or more processors, and machine-readable instructions stored in the memory that, upon execution by the one or more processors cause the system to carry out operations comprising:
  receiving data identifying each of a plurality of shipping containers, a customer associated with cargo within each shipping container, and a destination for each shipping container;
  providing, to a remote computing device operated by a first user, instructions for stacking at least a portion of the plurality of shipping containers in a rapid discharge yard;
  receiving data including identification and location of each of a plurality of truck drivers available to transport shipping containers; and
  providing, to one or more remote computing devices each associated with one of the plurality of truck drivers, instructions to proceed to the rapid discharge yard to obtain a shipping container from a top of a stack.

20. The system of embodiment 19, further comprising receiving from the remote computer device associated with each truck driver a container identifier for an obtained shipping container from the rapid discharge yard, and after receipt of the container identifier, providing to the remote computing device associated with each truck driver a destination for the identified shipping container.

21. The system of any of embodiments 19-20 further comprising providing to the truck driver who has delivered the shipping container to the destination further instructions to obtain another shipping container for delivery to another destination.

22. The system of any of embodiments 19-21 wherein the destination is an importing customer facility, a distribution center, a transloading facility, a warehouse, or an offsite container yard.

23. The system of any of embodiments 19-22, further comprising providing to at least one truck driver instructions to obtain an empty shipping container for transportation to a destination.

24. The system of any of embodiments 19-23, further comprising providing to at least one truck driver instructions to obtain an empty container from the destination and deliver the empty container to a further destination.

25. The system of embodiment 24, wherein the further destination is a seaport terminal, a rail yard, or an exporting customer facility.

26. The system of any of embodiments 19-25 further comprising determining a route for each of the plurality of truck drivers based at least in part on number and location of full and empty shipping containers, number and location of truck drivers, and minimization of miles driven and idling time by each of the truck drivers.

27. The system of any of embodiments 19-26, further comprising receiving a notice of acceptance of the instructions from at least one of the plurality of truck drivers.

28. The system of any of embodiments 19-27, further comprising receiving a notice of rejection of the instructions from at least one of the plurality of truck drivers, and providing to the truck driver further instructions to obtain a different shipping container at a different location.

29. The system of any of embodiments 19-28, further comprising receiving a request for an hours of service override from at least one of the truck drivers, and providing to the truck driver a selection of shipping containers to pick up.

30. The system of any of embodiments 19-29, wherein the first user is an operator of a seaport terminal or a rail yard.

31. The system of any of embodiments 19-30, wherein the instructions for stacking at least a portion of the plurality of shipping containers in the rapid discharge yard include placing together a subset of the shipping containers that are intended for a single destination or a single zone.

32. The system of any of embodiments 19-31, wherein the data identifying each of a plurality of shipping containers is received from one or more of a vessel, an operator of a seaport terminal, an operator of a rail yard, an owner of cargo in one or more of the shipping containers, a non-vessel operating common carrier, a freight forwarder, or a steamship line.

33. The system of any of embodiments 19-32, further comprising:
  receiving, from a remote computing device associated with a trucking company, data identifying truck drivers who drive for the trucking company; and
  sending to the remote computing device associated with the trucking company data regarding milestones of each driver transporting a shipping container to a destination, hours driven by each driver for a shift.

34. The system of any of embodiments 19-33, further comprising receiving from a remote computing device associated with an ocean carrier data regarding or more of vessel arrival times, container discharge dates and times, container available dates, container holds, and container damage.

35. The system of any of embodiments 19-34, further comprising receiving from a remote computing device associated with a seaport terminal data regarding one or more of container yard available capacity, number and identification of empty containers, status of vessels, availability status of containers, and delay events.

36. The system of any of embodiments 19-35, further comprising collecting payment from cargo owners for receipt of a shipping container laden with cargo, and transmitting payment to trucking companies and to chassis operators.

37. A method for coordinating movement of shipping containers through a terminal, comprising:
storing, in a computing system including memory and one or more processors, data identifying each of a plurality of shipping containers at the terminal, an owner of cargo associated with each shipping container, a destination for each shipping container, and a location of each shipping container at the terminal;
selecting, by the computing system, one or more of the shipping containers for transportation; and
assigning a selected shipping container to a delivery vehicle by order of arrival of the delivery vehicle at the terminal for delivery to a destination.

38. The method of embodiment 37, further comprising storing the shipping containers in stacks at the terminal, and the step of selecting one of the shipping containers for transportation comprises selecting a shipping container on a top of a stack.

39. The method of any of embodiments 37-38, further comprising loading the selected shipping container onto a truck driven by the truck driver.

40. The method of any of embodiments 37-39, further comprising, by the computing system, transmitting bills from trucking companies and chassis operators to the cargo owners, collecting payment from the cargo owners, and transmitting payment to the trucking companies and to the chassis operators.

41. The method of embodiment 40, wherein payments to the trucking companies and the chassis operators are equally distributed.

42. The method of any of embodiments 37-41, further comprising providing a customer application for an owner of cargo shipped in a shipping container for installation on a remote computing device, the customer application enabling the owner to transmit to the computing system data identifying a name of the owner, an identification of a shipping container to be picked up, a destination for the shipping container, and a request for a truck driver to pick up the shipping container.

43. The method of embodiment 42, wherein the request is to pick up one or a full container for import, a full container for export, or an empty container.

44. The method of any of embodiments 37-43, further comprising providing a dispatching application to a truck driver for installation on a remote computing device, the dispatching application enabling transmission of notifications to the truck driver and enabling the truck driver to transmit to the computing system data identifying current driver availability and current driver location, and an acknowledgement of a request to pick up a shipping container.

45. The method of any of embodiments 37-44, further comprising notifying a truck driver that a shipping container is available to be picked up at the terminal and requesting acceptance of a request to pick up the shipping container.

46. The method of any of embodiments 37-45, further comprising providing a terminal application to a terminal operator for installation on a remote computing device, the terminal application enabling the terminal operator to transmit data comprising notification of an arrival of shipping containers, an identification of each of the plurality of shipping containers, and locations of shipping containers within the terminal.

47. The method of any of embodiments 37-46, further comprising providing a chassis application to a chassis provider for installation on a remote subscriber computer, the chassis application enabling the chassis provider to transmit to the computing system data identifying availability of chassis.

48. The method of any of embodiments 37-47, wherein the terminal comprises a seaport or a rail yard.

49. A method for coordinating movement of shipping containers through a terminal, comprising:
storing, in a computing system including memory and one or more processors, data identifying each of a plurality of shipping containers at the terminal, an owner of cargo associated with each shipping container, a destination for each shipping container, and a location of each shipping container at the terminal; and
tendering, by the computer system, a load order to a drayage company to move a quantity of the plurality of shipping containers.

50. The method of embodiment 49, further comprising receiving, at the computer system, the data identifying each of the plurality of shipping containers from a user prior to arrival of the plurality of the shipping containers at the terminal.

51. The method of any of embodiments 49-50, further comprising receiving, at the computer system, a notification of a portion of the plurality of shipping containers stowed together in a block stow on a vessel prior to arrival at the terminal.

52. The method of any of embodiments 49-51, further comprising stowing a portion of plurality of shipping containers together in a block stow on a vessel prior to arrival at the terminal, and storing the portion together in a flow stack at the terminal after arrival at the terminal and unloading from the vessel.

53. The method of embodiment 52, wherein the portion contains shipping containers containing cargo from one cargo owner or a plurality of cargo owners.

54. The method of any of embodiments 49-53, further comprising receiving, at the computer system, a request from the drayage company for a load tender of the quantity of the plurality of shipping containers at the terminal for transportation to a destination.

55. The method of embodiment 54, further comprising receiving, at the computer system, an additional request from the drayage company for an additional drayage company to assist with transportation of a portion of the quantity of the shipping containers.

56. The method of any of embodiments 54-55, further comprising receiving, at the computer system, from the drayage company milestone updates for each shipping container transported by the drayage company, the milestone updates including one or more of a gate in by a truck driver, a gate out by the truck driver, and arrival of the truck driver at a destination with the shipping container.

57. The method of any of embodiments 49-56, further comprising, at the terminal, assigning a selected shipping container to a delivery vehicle from a stack of the one or more shipping containers, wherein the selected shipping container is accessible without moving other shipping containers in the stack.

58. The method of any of embodiments 49-57, further comprising, at the terminal, assigning a selected shipping container to a delivery vehicle by order of arrival of the delivery vehicle at the terminal for delivery to a destination.

59. The method of any of embodiments 49-58, further comprising tracking, by the computer system, each of the plurality of the shipping containers from the time of obtaining the data to a time of delivery of each of the shipping containers to a destination.

60. The method of any of embodiments 49-59, further comprising tendering, by the computer system, to the drayage company an option of transporting an empty container after delivery of a full container.

61. The method of embodiment 60, wherein the option comprises transporting an empty container to an export facility for loading with cargo for export.

62. The method of any of embodiments 49-61, further comprising, at the computer system, receiving a notification from the drayage company of an identification of a particular container picked up at the terminal and transmitting to the drayage company a destination for the particular container.

63. The method of embodiment 62, wherein the destination is one or more of location for delivery of cargo within each shipping container, a location for loading each shipping container with additional cargo for export, and a location for a return of each shipping container when empty.

64. The method of any of embodiments 49-63, further comprising tracking, at the computer system, milestones of the shipping containers as the shipping containers are transported.

65. The method of any of embodiments 49-64, further comprising tracking, at the computer system, shipping containers moved from the terminal to an off dock container yard.

66. A system for coordinating movement of shipping containers through a terminal, comprising:
a computing system including memory and one or more processors, and machine-readable instruction stored in the memory that, upon execution by the one or more processors cause the system to carry out operations comprising:
storing data identifying each of a plurality of shipping containers at the terminal, an owner of cargo associated with each shipping container, a destination for each shipping container, and a location of each shipping container at the terminal; and
tendering a load order to a drayage company to move a quantity of the plurality of shipping containers.

67. The system of embodiment 66, further comprising receiving the data identifying each of the plurality of shipping containers from a user prior to arrival of the plurality of the shipping containers at the terminal.

68. The system of any of embodiments 66-67, further comprising receiving a notification of a portion of the plurality of shipping containers stowed together in a block stow on a vessel prior to arrival at the terminal.

69. The system of embodiment 68, wherein the portion contains shipping containers containing cargo from one cargo owner or a plurality of cargo owners.

70. The system of any of embodiments 66-69, further comprising receiving a request from the drayage company for a load tender of the quantity of the plurality of shipping containers at the terminal for transportation to a destination.

71. The system of embodiment 70, further comprising receiving an additional request from the drayage company for an additional drayage company to assist with transportation of a portion of the quantity of the shipping containers.

72. The system of any of embodiments 70-71, further comprising receiving from the drayage company milestone updates for each shipping container transported by the drayage company, the milestone updates including one or more of a gate in by a truck driver, a gate out by the truck driver, and arrival of the truck driver at a destination with the shipping container.

73. The system of any of embodiments 66-72, further comprising tracking each of the plurality of the shipping containers from the time of obtaining the data to a time of delivery of each of the shipping containers to a destination.

74. The system of any of embodiments 66-73, further comprising tendering to the drayage company an option of transporting an empty container after delivery of a full container.

75. The system of embodiment 74, wherein the option comprises transporting an empty container to an export facility for loading with cargo for export.

76. The system of any of embodiments 66-75, further comprising receiving a notification from the drayage company of an identification of a particular container picked up at the terminal and transmitting to the drayage company a destination for the particular container.

77. The system of embodiment 76, wherein the destination is one or more of location for delivery of cargo within each shipping container, a location for loading each shipping container with additional cargo for export, and a location for a return of each shipping container when empty.

78. The system of any of embodiments 66-77, further comprising tracking milestones of the shipping containers as the shipping containers are transported.

79. The system of any of embodiments 66-78, further comprising tracking shipping containers moved from the terminal to an off dock container yard.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments described herein can be combined in a variety of ways. For example, a feature described in conjunction with one embodiment may be included in another embodiment even if not explicitly described in conjunction with that embodiment.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A method for coordinating transportation of shipping containers through a terminal, the method comprising:

receiving, by a computer system, data identifying each of a plurality of shipping containers, a customer associated with cargo within each shipping container, and a destination for each shipping container;
stacking at least a portion of the plurality of shipping containers organized together as a flow stack in a rapid discharge yard, wherein the rapid discharge yard includes one or more dedicated gates;
receiving, by the computer system, data including identification and location of each of a plurality of truck drivers available to transport shipping containers; and
providing, via one or more remote computing devices each associated with one of the plurality of truck drivers, instructions to proceed to the rapid discharge yard to obtain a shipping container from a top of a stack.

2. The method of claim 1, further comprising:
receiving, via the remote computer device associated with each truck driver, a container identifier for an obtained shipping container from the rapid discharge yard;
after receipt of the container identifier, providing, via the remote computing device associated with each truck driver, a destination for the identified shipping container, wherein the destination is an importing customer facility, a distribution center, a transloading facility, a warehouse, or an offsite container yard; and
determining a route for each of the plurality of truck drivers based at least in part on number and location of full and empty shipping containers, number and location of truck drivers, and minimization of miles driven and idling time by each of the truck drivers.

3. The method of claim 1, further comprising:
receiving a notice of acceptance of the instructions or a notice of rejection of the instructions from at least one of the plurality of truck drivers; and
when the notice of rejection of the instructions is received, providing, to the truck driver from whom the notice of rejection is received, further instructions to obtain a different shipping container.

4. The method of claim 1, further comprising:
providing, to the truck driver who has delivered the shipping container to the destination further instructions, the further instructions being to obtain another shipping container for delivery to another destination, or to obtain an empty container from the destination and deliver the empty container to a further destination, wherein the further destination comprises a seaport terminal, a rail yard, an exporting customer facility, an importing customer facility, a distribution center, a transloading facility, a warehouse, or an offsite container yard.

5. The method of claim 1, wherein the data identifying each of a plurality of shipping containers is received from one or more of a vessel, an operator of a seaport terminal, an operator of a rail yard, an owner of cargo in one or more of the shipping containers, a non-vessel operating common carrier, a freight forwarder, or a steamship line.

6. The method of claim 1, further comprising:
receiving, via a remote computing device associated with a trucking company, data identifying truck drivers who drive for a trucking company; and
sending, via the remote computing device associated with the trucking company, data regarding milestones of each of the truck drivers transporting a shipping container to a destination, and hours driven by each of the truck drivers for at least one driving shift.

7. A method for coordinating movement of shipping containers through a terminal, the method comprising:
storing, by a computer system, data identifying each of a plurality of shipping containers at the terminal, an owner of cargo associated with each shipping container, a destination for each shipping container, and a location of each shipping container at the terminal;
tendering, by the computer system, a load order to a drayage company to move a quantity of the plurality of shipping containers; and
unloading, from a vessel at the terminal, a portion of the plurality of shipping containers stored together on the vessel, into a flow stack.

8. The method of claim 7, wherein the portion of the plurality of shipping containers that is unloaded is stowed together in a block stow on the vessel prior to being unloaded.

9. The method of claim 7, further comprising one or more of:
receiving a request from the drayage company for a load tender of the quantity of the plurality of shipping containers at the terminal for transportation to a destination;
receiving, from the drayage company, milestone updates for each shipping container transported by the drayage company, the milestone updates including one or more of a gate in by a truck driver, a gate out by the truck driver, and arrival of the truck driver at a destination with the shipping container; and
tendering, to the drayage company, an option of transporting an empty container after delivery of a full container.

10. The method or claim 7, further comprising:
assigning a selected shipping container to a delivery vehicle from a stack of one or more of the plurality of shipping containers, wherein the selected shipping container is accessible without moving other shipping containers in the stack.

11. The method or claim 7, further comprising:
receiving a notification from the drayage company of an identification of a particular container picked up at the terminal; and
transmitting, to the drayage company, a destination for the particular container, wherein the destination for the particular container is one or more of a location for delivery of cargo within the particular container, a location for loading the particular container with additional cargo for export, and a location for a return of the particular container when empty.

12. The method of claim 7, further comprising:
providing, via computing devices of one or more drivers, at least one of a notice of dispatch, a load tender, or a notification, wherein a mobile application is installed on the computing devices of the one or more drivers for enabling communication between computing devices of the one or more drivers and a system for coordinating movement of shipping containers through the terminal.

13. The method of claim 12, wherein the computing devices of the one or more drivers comprise at least one of: a mobile device, a tablet, or a computer comprising a hardware processor and a memory.

* * * * *